US012521678B2

(12) United States Patent
Taylor et al.

(10) Patent No.: US 12,521,678 B2
(45) Date of Patent: Jan. 13, 2026

(54) CONTACTOR MODULE AND CONTACTOR PANEL INCLUDING CONTACTOR MODULE

(71) Applicant: 3M INNOVATIVE PROPERTIES COMPANY, St. Paul, MN (US)

(72) Inventors: Gareth P. Taylor, Indian Trail, NC (US); Timothy D. Price, Monroe, NC (US); Scott A. Baum, La Valle, WI (US); Ravi Kolakaluri, Roseville, MN (US); Vadim N. Savvateev, St. Paul, MN (US); Shannon S. Le Blanc, White Bear Lake, MN (US); Dian Zheng, Woodbury, MN (US); Brinda B. Badri, Woodbury, MN (US); Paul A. Nielsen, LaGrange, GA (US); Amitava Sengupta, Charlotte, NC (US); Michael C. Flom, Apple Valley, MN (US); Catherine A. Leatherdale, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 456 days.

(21) Appl. No.: 17/925,110

(22) PCT Filed: May 19, 2021

(86) PCT No.: PCT/IB2021/054327
§ 371 (c)(1),
(2) Date: Nov. 14, 2022

(87) PCT Pub. No.: WO2021/255546
PCT Pub. Date: Dec. 23, 2021

(65) Prior Publication Data
US 2023/0182081 A1 Jun. 15, 2023

Related U.S. Application Data

(60) Provisional application No. 63/041,417, filed on Jun. 19, 2020.

(51) Int. Cl.
*B01D 63/04* (2006.01)
*B01D 63/14* (2006.01)
(Continued)

(52) U.S. Cl.
CPC .......... *B01D 63/043* (2013.01); *B01D 63/14* (2013.01); *B01D 53/268* (2013.01);
(Continued)

(58) Field of Classification Search
CPC .... B01D 53/268; B01D 63/043; B01D 63/14; B01D 2313/06; B01D 2313/14; B01D 2313/54; F24F 6/04
See application file for complete search history.

(56) References Cited

U.S. PATENT DOCUMENTS 3,965,012 A * 6/1976 Eguchi ................... B01D 63/14
210/493.1
4,911,846 A 3/1990 Akasu et al.
5,041,220 A * 8/1991 Lee ...................... B01D 63/043
210/321.89
(Continued)

FOREIGN PATENT DOCUMENTS

CN 106422791 A 2/2017
JP 2004101161 A 4/2004

OTHER PUBLICATIONS

European Patent Application No. 21825872.1 Supplementary European Search Report dated Apr. 25, 2024 (19 pages).
International Search Report received for PCT International Application No. PCT/IB2021/054327, mailed on Aug. 23, 2021, 3 pages.

*Primary Examiner* — Charles S Bushey

(57) ABSTRACT

A contactor module for a contactor panel includes a frame member and a contactor media coupled to the frame member. The contractor module defines a first side and a second side. The contactor media includes at least one first membrane array including a plurality of first hollow fibers extending along a first fiber axis. The at least one first membrane array defines a first axis. Further, the contactor
(Continued)

module includes at least one second membrane array including a plurality of second hollow fibers extending along a second fiber axis. The at least one second membrane array defines a second axis. The at least one first membrane array and the at least one second membrane array is disposed such that a first inclination angle is defined between the first axis and the second axis. Moreover, the first inclination angle is greater than zero degree and less than 180 degrees.

17 Claims, 20 Drawing Sheets

(51) Int. Cl.
    *B01D 53/26*     (2006.01)
    *F24F 6/04*     (2006.01)

(52) U.S. Cl.
    CPC ...... *B01D 2313/06* (2013.01); *B01D 2313/14* (2013.01); *B01D 2313/54* (2013.01); *F24F 6/04* (2013.01)

(56) References Cited

U.S. PATENT DOCUMENTS

| | | | |
|---|---|---|---|
| 5,104,535 | A | 4/1992 | Cote et al. |
| 5,236,665 | A * | 8/1993 | Mathewson ........ A61M 1/1629 |
| | | | 210/499 |
| 5,248,424 | A | 9/1993 | Cote et al. |
| 5,480,553 | A | 1/1996 | Yamamori et al. |
| 5,747,138 | A | 5/1998 | Leonard |
| 6,022,478 | A | 2/2000 | Baurmeister et al. |
| 6,485,538 | B1 | 11/2002 | Toyoshima |
| 7,387,730 | B2 * | 6/2008 | Nakahara ............. B01D 63/043 |
| | | | 210/321.89 |
| 7,695,550 | B2 | 4/2010 | Krupenkin et al. |
| 8,728,316 | B2 | 5/2014 | Nakahara et al. |
| 9,254,464 | B2 | 2/2016 | Keller et al. |
| 9,541,302 | B2 | 1/2017 | Taylor et al. |
| 11,767,992 | B2 * | 9/2023 | Sweeney ............ F28D 21/0015 |
| | | | 62/315 |
| 2009/0236280 | A1 | 9/2009 | Morita et al. |
| 2010/0307118 | A1 | 12/2010 | Kawano et al. |
| 2013/0146518 | A1 | 6/2013 | Suk |
| 2015/0285190 | A1 | 10/2015 | Shimizu et al. |

* cited by examiner

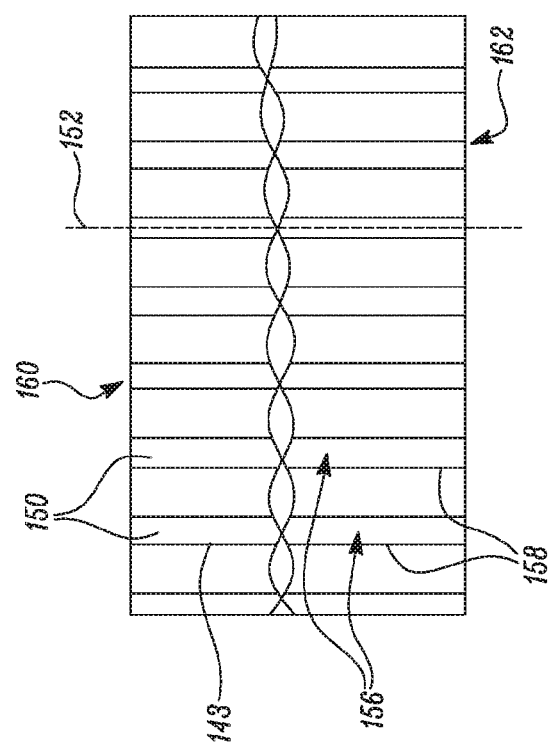

CONTACTOR MODULE AND CONTACTOR PANEL INCLUDING CONTACTOR MODULE

CROSS REFERENCE TO RELATED APPLICATIONS

This application is a national stage filing under 35 U.S.C. 371 of PCT/IB2021/054327, filed May 19, 2021, which claims the benefit of U.S. Provisional Application No. 63/041,417 filed Jun. 19, 2020, the disclosures of which are incorporated by reference in their entireties herein.

TECHNICAL FIELD

The present disclosure relates to a contactor panel. More specifically, the present disclosure relates to a contactor module associated with the contactor panel.

BACKGROUND

A contactor is typically used to treat a fluid for varying a mass content or a heat content of the fluid. Accordingly, the contactor can be used in an evaporative cooling system, a heating system, a humidifying system, a dehumidifying system, and the like. The contactor may be used to bring two immiscible fluid phases (such as gas/gas, liquid/liquid, gas/liquid) in contact with each other to cause mass transfer or heat transfer from one fluid to another.

Such contactors typically include a contactor media installed in a frame member. Conventional contactors either include a wetted cellulosic media or a membrane array such as that explained in U.S. Pat. No. 9,541,302, hereinafter referred to as the '302 patent. The '302 patent describes use of a flat panel contactor having a plurality of hollow fibers that realize the function of separation and/or transfer from one fluid to another.

BRIEF SUMMARY

In large scale applications, usage of a single large contactor may not be feasible due to space constraints and/or servicing replacement issues. Further, in some cases, a plurality of contactors may be used to realize requirements of large scale applications. Moreover, some applications may demand installation of the contactors in a smaller space along with high contactor efficiency. Such applications may require the contactors to be arranged in a complex arrangement based on an availability of space and desired contactor efficiency. There may be instances where working with multiple contactors may involve longer time periods for mass or heat transfer, efficiency constraints, and other implementation challenges, particularly for applications involving complex arrangement of the contactors. Thus, it is desirable to configure the contactor media in a manner that may provide improved efficiency and involves a simpler structure for the contactors.

Some embodiments of the present disclosure relates to a contactor module for a contactor panel. The contactor module includes a frame member. The contactor module also includes a contactor media coupled to the frame member. The contactor media defines a first side and a second side. The contactor media includes at least one first membrane array including a plurality of first hollow fibers extending along a first fiber axis. The at least one first membrane array defines a first axis that is generally perpendicular to the first fiber axis and extending along the at least one first membrane array. The contactor module also includes at least one second membrane array including a plurality of second hollow fibers extending along a second fiber axis. The at least one second membrane array defines a second axis that is generally perpendicular to the second fiber axis and extending along the at least one second membrane array. The at least one first membrane array and the at least one second membrane array is disposed such that a first inclination angle is defined between the first axis of the at least one first membrane array and the second axis of the at least one second membrane array. The first inclination angle is greater than zero degree and less than 180 degrees.

Some embodiments of the present disclosure relates to a contactor panel associated with a contactor system. The contactor panel includes a first header including at least one first port that allows introduction of a first fluid in the first header. The contactor panel also includes a second header including at least one second port that allows exit of the first fluid from the second header. The contactor panel further includes a contactor module extending between the first header and the second header. The contactor module includes a frame member. The contactor module also includes a contactor media coupled to the frame member. The contactor media defines a first side and a second side. The contactor media includes at least one first membrane array including a plurality of first hollow fibers extending along a first fiber axis. The at least one first membrane array defines a first axis that is generally perpendicular to the first fiber axis and extending along the at least one first membrane array. The contactor media also includes at least one second membrane array including a plurality of second hollow fibers extending along a second fiber axis. The at least one second membrane array defines a second axis that is generally perpendicular to the second fiber axis and extending along the at least one second membrane array. The at least one first membrane array and the at least one second membrane array is disposed such that a first inclination angle is defined between the first axis of the at least one first membrane array and the second axis of the at least one second membrane array. The first inclination angle is greater than zero degree and less than 180 degrees.

Some embodiments of the present disclosure relates to a contactor module for a contactor panel. The contactor module includes a frame member. The contactor module also includes a contactor media coupled to the frame member. The contactor media defines a first side and a second side. The contactor media includes at least one first membrane array including a plurality of first hollow fibers extending along a first fiber axis. The at least one first membrane array defines a first axis that is generally perpendicular to the first fiber axis and extending along the at least one first membrane array. Each first hollow fiber defines a first lumen adapted to receive a first fluid and a first exterior surface adapted to contact a second fluid. The contactor media also includes at least one second membrane array including a plurality of second hollow fibers extending along a second fiber axis. The at least one second membrane array defines a second axis that is generally perpendicular to the second fiber axis and extending along the at least one second membrane array. Each second hollow fiber defines a second lumen adapted to receive the first fluid and a second exterior surface adapted to contact the second fluid. The at least one first membrane array and the at least one second membrane array is disposed such that a first inclination angle is defined between the first axis of the at least one first membrane array and the second axis of the at least one second membrane array. The first inclination angle is greater than zero degree and less than 180 degrees.

BRIEF DESCRIPTION OF THE SEVERAL VIEWS OF THE DRAWINGS

Like symbols in the drawings indicate like elements. To easily identify the discussion of any particular element or act, the most significant digit or digits in a reference number may refer to the figure number in which that element is first introduced.

FIG. 7B illustrates a portion of a second membrane array associated with the contactor module of FIG. 3A in accordance with some embodiments discussed herein.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the context of present disclosure, the terms "first" and "second" are used as identifiers. Therefore, such terms should not be construed as limiting of this disclosure. The terms "first" and "second" when used in conjunction with a feature or an element can be interchanged throughout the embodiments of this disclosure.

The present disclosure generally relates to a contactor panel including a contactor module. The contactor panel may be used for mass transfer or heat transfer between fluids in an air handling, ventilation, or duct system. The contactor module includes a contactor media having several hollow fibers. A first fluid flows through each hollow fiber while a second fluid contacts an exterior surface of each hollow fiber. The teachings of this disclosure is directed towards usage of the contactor media having an improved design that may increase a surface contact area for the second fluid. Further, an arrangement of the contactor media increases a total number of the hollow fibers for a given size of the contactor panel. The contactor panel described herein may provide a high contact surface area to volume ratio which may in turn translate to a compact footprint and system size and may also improve an efficiency of the contactor system.

Further, various embodiments of the contactor panel described in this disclosure may be associated with an air duct, ventilation air duct, return (return air grille), vent, diffuser, filter housing, air handling equipment. The air handling equipment may include a Heating, Ventilation, and Air conditioning (HVAC) equipment, Heating, Ventilation, Air conditioning, and Refrigeration (HVACR or HVAC&R) equipment, Heating, Air conditioning, and Refrigeration (HACR) equipment, forced ventilation equipment, Energy Recovery Ventilation (ERV) equipment, Air conditioning (AC) equipment, refrigeration equipment, air handlers, and the like.

Figure 1:
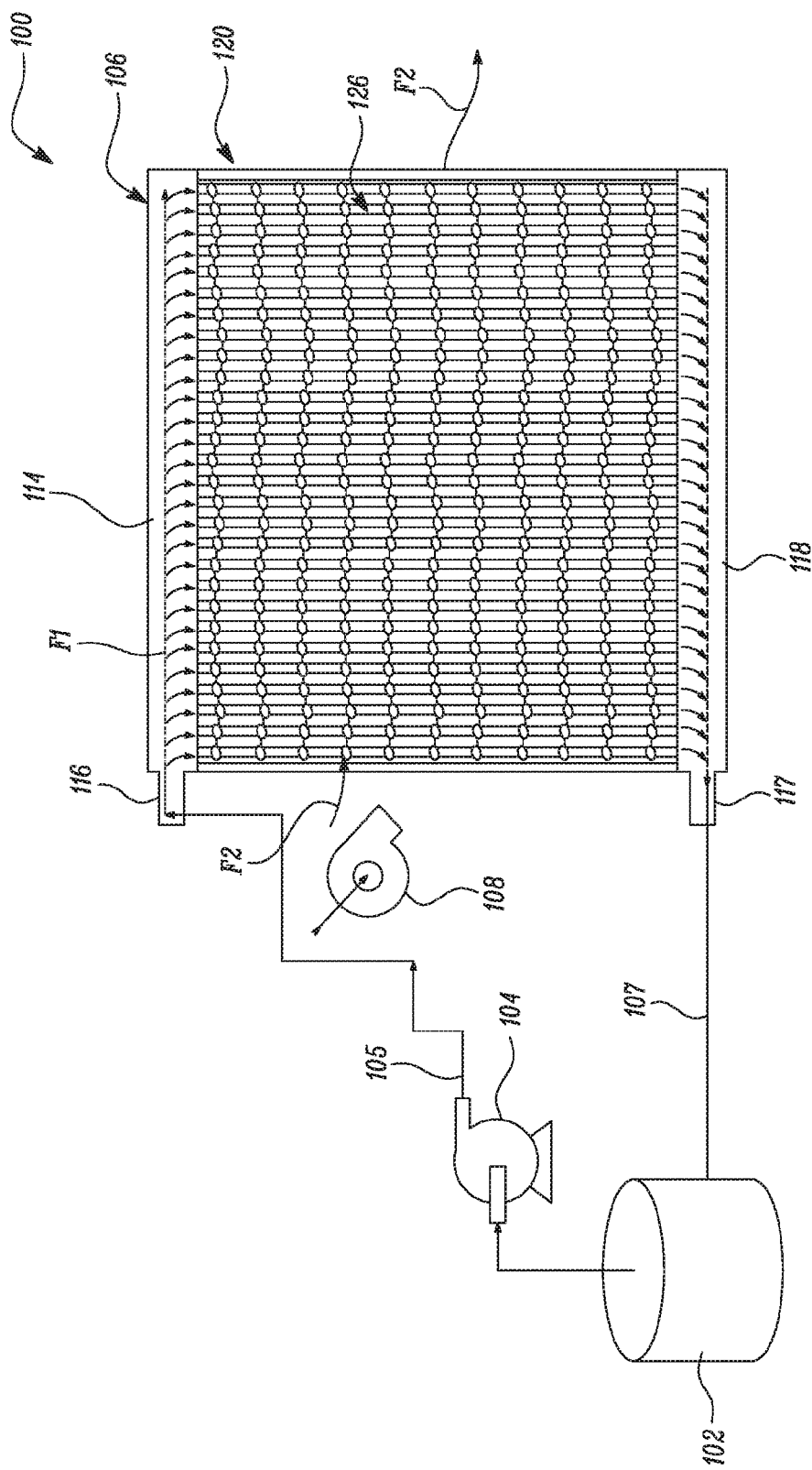
FIG. 1 illustrates a schematic view of a contactor system in accordance with some embodiments discussed herein.

FIG. 1 illustrates a schematic view of a contactor system 100, according to an embodiment of the present disclosure. The contactor system 100 described herein may be embodied as an evaporative cooling system, a heating system, a humidification system, and/or a dehumidification system. In the illustrated embodiment, the contactor system 100 is embodied as a closed loop system. The contactor system 100 includes a contactor panel 106. Further, an operation of the contactor system 100 is independent of an orientation of the contactor panel 106 as a first fluid flowing through the contactor panel 106 does not drip by gravity. More particularly, the contactor system 100 includes components that direct the first fluid through the contactor panel 106 and may not require positioning of a reservoir/distributor at an elevation.

The contactor system 100 includes a tank 102. The tank 102 is embodied as a reservoir or vessel for holding the first fluid therein. In some examples, the first fluid may be precooled or preheated based on an application of the contactor system 100. Accordingly, the tank 102 may be in fluid communication with a chilling module (not shown) or a heating module (not shown) in order to precool or preheat the first fluid. In one example, the first fluid is at least one of a liquid and a gas. Further, the first fluid may include a liquid, a gas, a sweep gas, air, forced air, a vacuum, or combinations thereof. The liquid may include, for example, a cold and/or absorbent liquid, a salt solution, a hot and/or humidifying liquid, or a liquid desiccant. A type of the first fluid may vary based on an application of the contactor system 100. When the contactor system 100 is embodied as the evaporative cooling system, the tank 102 holds water or air therein. Further, when the contactor system 100 is embodied as the dehumidification system, the tank 102 holds the liquid desiccant or air therein.

The contactor system 100 also includes a pump 104. The pump 104 is disposed in a first fluid conduit 105 that provides fluid communication between the tank 102 and the contactor panel 106. The pump 104 pressurizes the first fluid to introduce the pressurized first fluid in the contactor panel 106. In some examples, the pump 104 may be designed to pressurize the first fluid to a pressure not higher than 5 pounds per square inch. The pump 104 may further allow variation in a flow rate of the first fluid being directed towards the contactor panel 106. The flow rate of the first fluid may vary based on a size of the contactor system 100 or an application thereof. In some examples, the flow rate may be approximately equal to 0.5 Gallon Per Minute (GPM) to 1 GPM. In other examples, the first fluid may flow at higher flow rates based on a type of application. A flow of the first fluid through the contactor panel 106 is illustrated by a first fluid flow "F1". The first fluid flows from the tank 102 towards the contactor panel 106 via the first fluid conduit 105. Further, a second fluid conduit 107 provides fluid communication between the tank 102 and the contactor panel 106. The first fluid flows from the contactor panel 106 towards the tank 102 via the second fluid conduit 107. In other embodiments, the contactor system 100 may be designed such that the first fluid drips through the contactor panel 106 by gravity, without limiting the scope of the present disclosure.

Further, the contactor system 100 includes a blower assembly 108. The blower assembly 108 directs a second fluid towards the contactor panel 106. The blower unit 108 may allow the second fluid to be pushed or pulled through the contactor panel 106. A flow direction, illustrated by a second fluid flow "F2" in FIG. 1, of the second fluid through the contactor panel 106 in one exemplary embodiment is transverse to a flow direction of the first fluid through. In some embodiments, the flow direction of the second fluid may be "parallel-flow" (same direction) or "counter-flow" (opposite direction) to the flow direction of the first fluid through the contactor panel 106 as illustrated by the first fluid flow "F1" in FIG. 1. In one example, the second fluid is at least one of a liquid and a gas. The second fluid may include a liquid, a gas, sweep gas, air, forced air, a vacuum, or combinations thereof. The liquid may include, for example, a cold and/or absorbent liquid, a salt solution, a hot and/or humidifying liquid, or a liquid desiccant. A type of the second fluid may vary based on an application of the contactor system 100. In some examples, a filter (not shown) may be positioned upstream of the contactor panel 106 to allow filtering of the second fluid before the second fluid contacts a contactor module 120 of the contactor panel 106.

Figure 2:
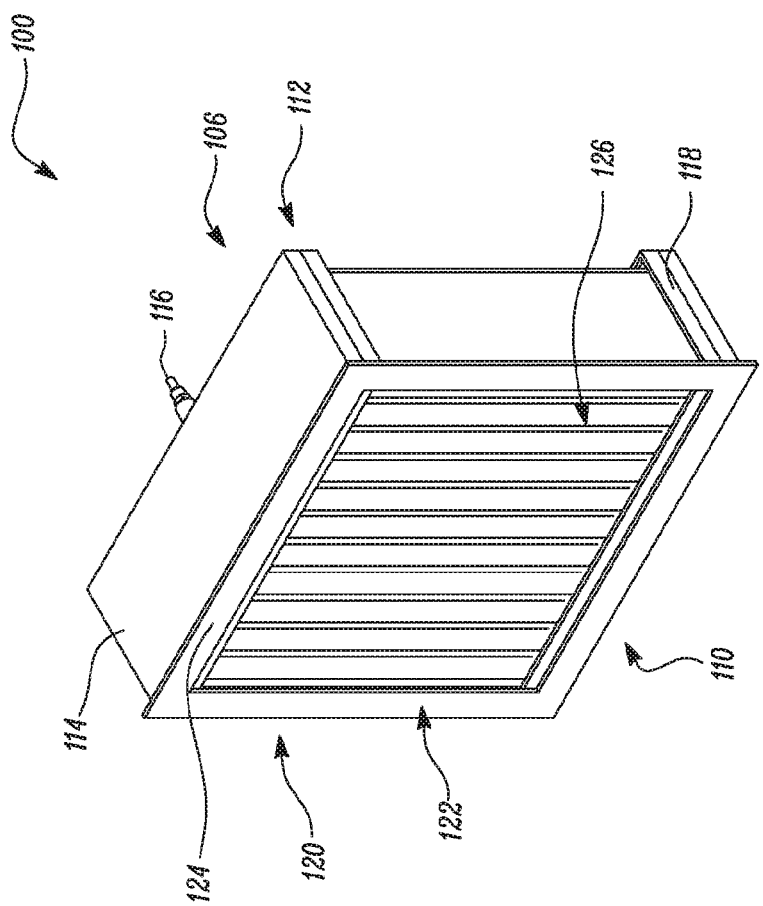
FIG. 2 illustrates a perspective view of a contactor panel associated with the contactor system of FIG. 1 in accordance with some embodiments discussed herein.

Referring to FIG. 2, a perspective view of the contactor panel 106 associated with the contactor system 100 is illustrated. The contactor panel 106 defines a front end 110 and a rear end 112. The contactor panel 106 includes a first header 114 including at least one first port 116 that allows introduction of the first fluid in the first header 114. The tank 102 (see FIG. 1) is in fluid communication with the first header 114. The first header 114 is adapted to receive the first fluid from the tank 102. More particularly, the tank 102 is in fluid communication with the first header 114 via the first fluid conduit 105 (see FIG. 1) and the first port 116. The first header 114 is embodied as an inlet header. In the illustrated example, the first header 114 includes a single first port 116 that is disposed proximate the rear end 112 of the contactor panel 106. Alternatively, the first header 114 may include a pair of first ports 116. The first port 116 is centrally disposed relative to the first header 114 and projects outwards from the first header 114. Further, the first header 114 is generally cuboid shaped.

The contactor panel 106 also includes a second header 118 including at least one second port 117 (shown in FIG. 6) that allows exit of the first fluid from the second header 118. Further, the tank 102 is in fluid communication with the second header 118. The second header 118 is adapted to direct the first fluid towards the tank 102. More particularly, the tank 102 is in fluid communication with the second header 118 via the second fluid conduit 107 and the second port 117. The second header 118 is embodied as an outlet header. In the illustrated example, the second header 118 includes a single second port 117 that is disposed proximate the rear end 112 of the contactor panel 106. Alternatively, the second header 118 may include a pair of second ports 117. The second port 117 in centrally disposed relative to the second header 118 and projects outwards from the second header 118. Further, the second header 118 is generally cuboid shaped.

Figure 3A:
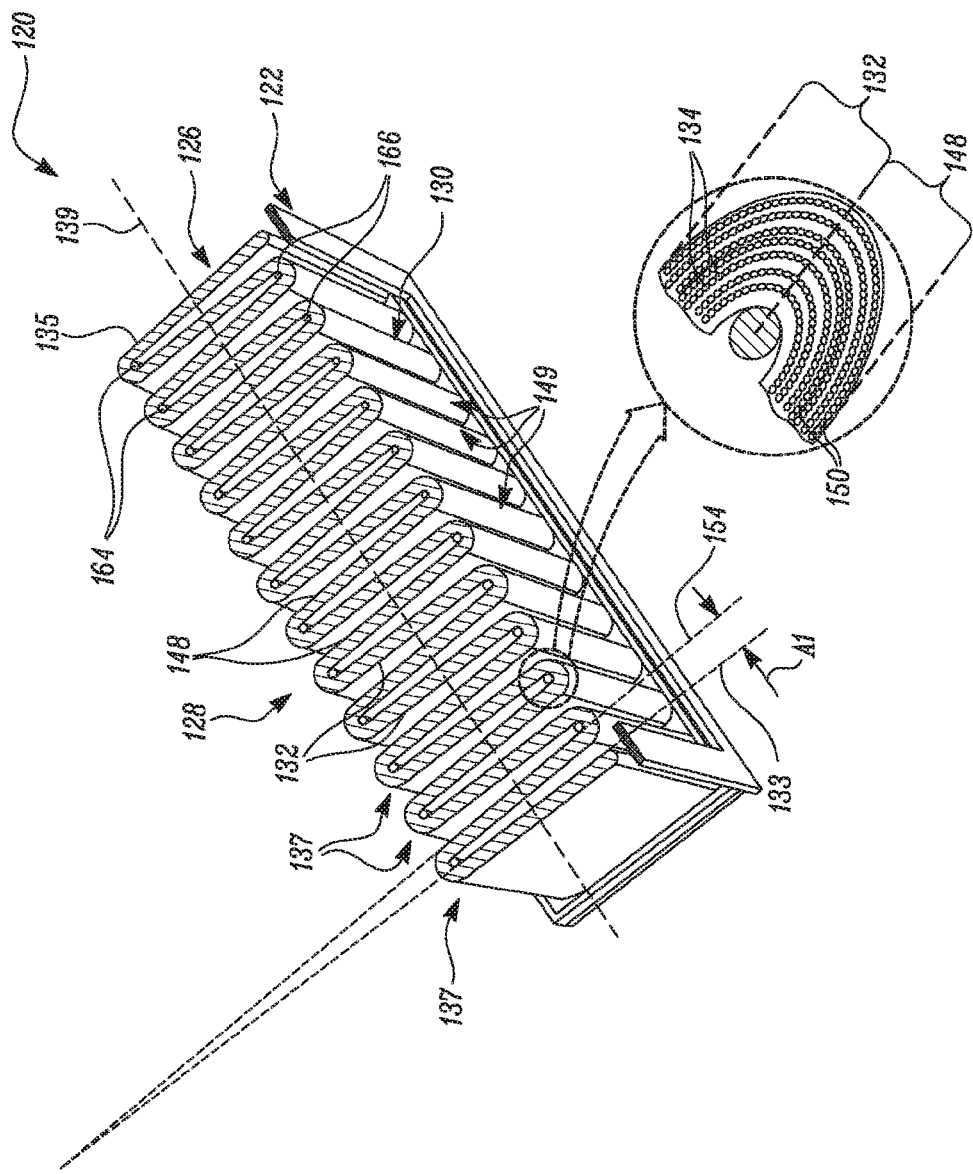
FIG. 3A illustrates a cut-away perspective view of a contactor module associated with the contactor panel of FIG. 2 in accordance with some embodiments of the present disclosure herein.

As illustrated, the contactor system 100 includes the contactor module 120. The contactor module 120 extends between the first header 114 and the second header 118. The contactor module 120 includes a frame member 122. The frame member 122 defines a frame portion 124 disposed at the front end 110 of the contactor panel 106. Referring to FIG. 3A, the contactor module 120 also includes a contactor media 126 coupled to the frame member 122. More particularly, the contactor media 126 is supported by the frame member 122. In an example, the contactor media 126 is used as an evaporative cooling media. In another example, the contactor media 126 is used as a dehumidification media. The contactor media 126 defines a first side 128 and a second side 130.

Further, the contactor media 126 includes at least one first membrane array 132 and at least one second membrane array 148. The at least one first membrane array 132 and the at least one second membrane array 148 is similar to the hollow fiber membrane array described in U.S. Pat. No. 9,541,302, hereinafter referred to as '302 patent. It should be noted that details corresponding to a design, material, and manufacturing of the at least one first membrane array 132 and at least one second membrane array 148 is similar to a design, material, and manufacturing of the hollow fiber membrane array described in the '302 patent.

The contactor media 126 defines an axis 139. The contactor media 126 includes the at least one first membrane array 132 including a plurality of first hollow fibers 134 (shown in FIG. 7A) extending along a first fiber axis 136 (shown in FIG. 7A). The at least one first membrane array 132 defines a first axis 133 that is generally perpendicular to the first fiber axis 136 and extending along the at least one first membrane array 132. Further, the first hollow fibers 134 may be hereinafter interchangeably referred to as the hollow fibers 134. Each first hollow fiber 134 defines a first lumen 138 (shown in FIG. 7A) adapted to receive the first fluid and a first exterior surface 140 (shown in FIG. 7A) adapted to contact the second fluid. A wall 142 (shown in FIG. 7A) of each first hollow fiber 134 separates the first lumen 138 and the first exterior surface 140. Each first hollow fiber 134 defines a first end 144 (shown in FIG. 7A) and a second end 146 (shown in FIG. 7A). The first end 144 and the second end 146 are embodied as open ends.

The contactor media 126 also includes at least one second membrane array 148 including a plurality of second hollow fibers 150 (shown in FIG. 7B) extending along a second fiber axis 152 (shown in FIG. 7B). The at least one second membrane array 148 defines a second axis 154 that is generally perpendicular to the second fiber axis 152 and extending along the at least one second membrane array 148. Further, the second hollow fibers 150 may be hereinafter interchangeably referred to as the hollow fibers 150. Each second hollow fiber 150 defines a second lumen 156 (shown in FIG. 7B) adapted to receive the first fluid and a second exterior surface 158 (shown in FIG. 7B) adapted to contact the second fluid. A wall 143 (shown in FIG. 7B) of each second hollow fiber 150 separates the second lumen 156 and the second exterior surface 158. Each second hollow fiber 150 defines a first end 160 and a second end 162. The first end 160 and the second end 162 are embodied as open ends.

Further, the at least one first membrane array 132 and the at least one second membrane array 148 is disposed such that a first inclination angle "A1" is defined between the first axis 133 of the at least one first membrane array 132 and the second axis 154 of the at least one second membrane array 148. The first inclination angle "A1" is greater than zero degree and less than 180 degrees. In some embodiments, the first inclination angle "A1" lies between 2 degrees and 175 degrees. Further, in one example, the at least one first membrane array 132 is connected to the at least one second membrane array 148 proximate the first side 128 of the contactor media 126 and the at least one first membrane array 132 is spaced apart from the at least one second membrane array 148 proximate the second side 130 of the contactor media 126. In another example, the at least one first membrane array 132 is connected to the at least one second membrane array 148 proximate the second side 130 of the contactor media 126 and the at least one first membrane array 132 is spaced apart from the at least one second membrane array 148 proximate the first side 128 of the contactor media 126.

In an embodiment, the contactor media 126 may include a single first membrane array 132 and a single second membrane array 148 that is angularly disposed relative to the single first membrane array 132. However, in the illustrated embodiment, the contactor media 126 includes a plurality of first membrane arrays 132 and a plurality of second membrane arrays 148. More particularly, the contactor media 126 is a continuous membrane array 135 defining the plurality of first membrane arrays 132 and the plurality of second membrane arrays 148. Further, the contactor media 126 includes alternately disposed first membrane arrays 132 and second membrane arrays 148. The plurality of first membrane arrays 132 are substantially parallel to each other. Moreover, the plurality of second membrane arrays 148 are substantially parallel to each other. As illustrated in the zoomed-in view of a portion of the contactor media 126, a junction of the first membrane array 132 and an adjacently disposed second membrane array 148 includes the hollow fibers 134, 150 so as to form the continuous membrane array 135.

Further, the first inclination angle "A1" between each first membrane array 132 and the adjacently disposed second membrane array 148 may vary based on a total number of the first membrane arrays 132, a total number of the second membrane arrays 148, dimensions of the contactor module 120, and the like. It should be noted that the total number of the first membrane arrays 132 and the total number of the second membrane arrays 148 illustrated in the accompanying figures is exemplary in nature, and an actual number of the first membrane arrays 132 and an actual number of the second membrane arrays 148 may vary, as per application requirements.

Further, the contactor media 126 defines a number of first pair of arrays 137 including the first membrane array 132 and the second membrane array 148. For each first pair of arrays 137, the first membrane array 132 is connected to the adjacent second membrane array 148 proximate the first side 128 of the contactor media 126 and each first membrane array 132 is spaced apart from the adjacent second membrane array 148 proximate the second side 130 of the contactor media 126. Further, the contactor media 126 defines a number of second pair of arrays 149 including the first membrane array 132 and the second membrane array 148. For each second pair of arrays 149, the first membrane array 132 is connected to the adjacent second membrane array 148 proximate the second side 130 of the contactor media 126 and the first membrane array 132 is spaced apart from the adjacent second membrane array 148 proximate the first side 128 of the contactor media 126. The arrangement of the first membrane arrays 132 and the second membrane arrays 148 defined herein may increase a contact surface area for an available volume. Further, a higher contact surface area to volume ratio may translate to compact system sizes.

Using the said contactor media 126 may pose some unique mechanical challenges that include, but are not limited to, first, preventing the contactor media 126 from unfolding, unwinding, or spreading, and second, a requirement to withstand loads induced by the second fluid flow "F2". A differential pressure created by pressure drop across the contactor media 126 creates a load as it acts upon the pressure area of the contactor panel 106.

These challenges may be resolved by introduction of a first and second means for structural support 164, 166. More particularly, the contactor module 120 includes a plurality of first means for structural support 164 disposed proximate the first side 128 of the contactor media 126 and a plurality of second means for structural support 166 disposed proximate the second side 130 of the contactor media 126. Further, each of the first means for structural support 164 and the second means for structural support 166 includes at least one of a bar member and a tension member. In one embodiment, the first means for structural support 164 and the second means for structural support 166 are embodied as bar members. More particularly, the first and second means for structural support 164, 166 are bar members, embodied as rigid articles including, but not limited to, rods, plates, posts, pillars, studs, stakes, poles, stiffeners, ribs and rib structures, beams, springs, braces, columns, frames, and guides. In other embodiments, the first means for structural support 164 and the second means for structural support 166 may include tension members, without any limitations. More particularly, the first and second means for structural support 164, 166 are tension members, embodied as generally flexible articles including, but not limited to, wires, strings, filaments, cables, ribbons, threads, lines, yarns, tensioned springs, and laces.

The first and second means for structural support 164, 166 are embodied as rod shaped members herein that extend between the first and second headers 114, 118 (see FIG. 2). The contactor media 126 is at least one of wound, folded, and pleated about each of the first means for structural support 164 and the second means for structural support 166. More particularly, the continuous membrane array 135 can be wound, folded, or pleated in a V-shaped arrangement about each of the means for structural support 164 and the means for structural support. It should be noted that the continuous membrane array 135 is wound, folded, or pleated along the axis 139. In the illustrated example, the continuous membrane array 135 is pleated about the means for structural support 164 and the second means for structural support 166 along the axis 139. Further, each of the first means for structural support 164 and the second means for structural support 166 may prevent the contactor media 126 from unfolding, unwinding, or spreading.

Each of the at least one first membrane array 132 and the at least one second membrane array 148 is a microporous, hydrophobic, hollow fiber membrane array. More particularly, each first membrane array 132 and each second membrane array 148 is embodied as the microporous, hydrophobic, hollow fiber membrane array. Because of the hydrophobic nature of the first and second membrane arrays 132, 148, the membrane arrays 132, 148 act as an inert support to allow direct contact between a gas and liquid phase, without dispersion. Further, a barrier is created between the first fluid and the second fluid. The membrane arrays 132, 148 may be manufactured using a dry stretch process. Each first membrane array 132 and each second membrane array 148 may be made of one or more of a polymer such as a polyolefin (PO), a polypropylene (PP), a polymethyl pentene (PMP), a poly(4-methyl-1-pentene), and the like. Moreover, pore sizes of the hollow fibers 134, 150 of each first membrane array 132 and each second membrane array 148 may be between 0.01 micron and 0.05 micron. In a specific example, the pore sizes of the hollow fibers 134, 150 of each first membrane array 132 and each second membrane array 148 may be less than 0.04 micron. Thus, bacteria, such as legionella, and/or dissolved minerals may be prevented from entering the second fluid, which may reduce a probability of surface fouling occurrence.

Figure 3B:
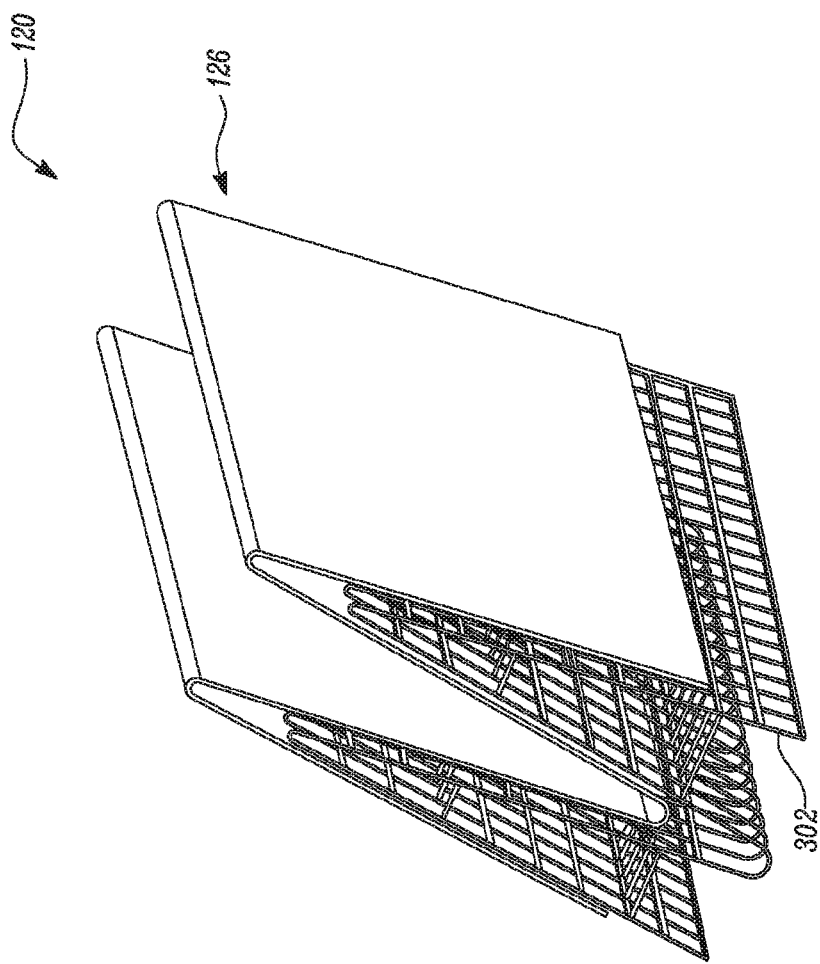
FIG. 3B illustrates a contactor media and a separator structure disposed adjacent to the contactor media in accordance with some embodiments of the present disclosure herein.

Referring now to FIG. 3B, a portion of the contactor media 126 associated with the contactor module 120 is illustrated. In this embodiment, the contactor module 120 may include at least one separator structure 302 disposed adjacent to the contactor media 126. The shape of the at least one separator structure 302 is similar to a shape of the contactor media 126. Thus, the separator structure 302 includes a generally V-shaped structure. The separator structure 302 is designed such that the contactor media 126 may receive the separator structure 302 at the first side 128 (see FIG. 3A) or the second side 130 (see FIG. 3B). In the illustrated example, the separator structure 302 includes a truss type separator. It should be noted that the shape and a design of the separator structure 302 shown herein is exemplary in nature and the shape and the design of the separator structure 302 may vary as per application requirements. In one example, the separator structure 302 is manufactured from a non-woven material. In some examples, the separator structure 302 may be manufactured from a metal or a plastic that is compatible with the second fluid flowing across the contactor module 120. In the illustrated example, the separator structure 302 includes a grille structure having a number of horizontal bar members and a number of vertical bar members. However, the separator structure 302 may include other designs. For example, the separator structure 302 may include a honeycomb structure, a sheet of metal or polymer having a number of through apertures, and the like, without any limitations.

The separator structure 302 provides support to the contactor media 126 and may prevent the contactor media 126 from flexing, unfolding, unwinding, or spreading. The separator structure 302 decreases deflection of the hollow fibers 134, 150 and provides structural stability to the contactor media 126 against pressure being applied by the second fluid. Moreover, incorporation of the separator structure 302 may increase an overall thickness of the contactor module 120. The increase in the thickness of the contactor module 120 may increase an exposure time of the second fluid flowing through the contactor module 120 and provide reduction in pressure drop across the contactor module 120 which may in turn improve effectiveness of the contactor module 120.

Figure 3C:
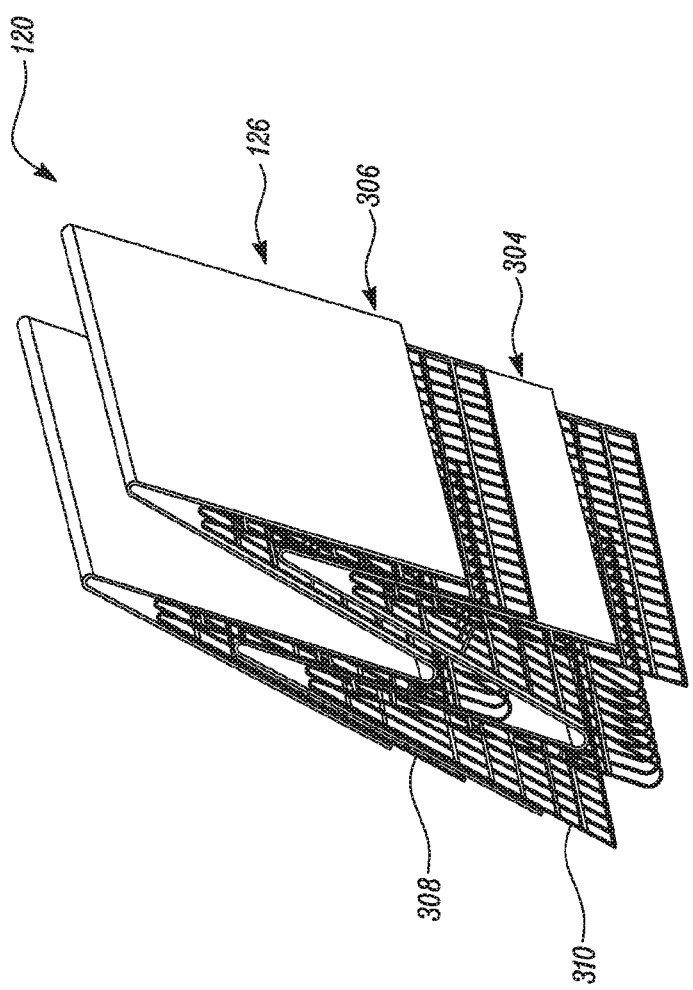
FIG. 3C illustrates a contactor media including a pair of continuous membrane arrays disposed adjacent to each other in accordance with some embodiments of the present disclosure herein.

FIG. 3C illustrates another embodiment of the present disclosure. In this embodiment, the contactor media 126 includes at least two continuous membrane arrays 304, 306 disposed adjacent to each other. As illustrated, the contactor media 126 includes a pair of continuous membrane arrays 304, 306. However, it should be noted that a total number of the continuous membrane arrays 304, 306 may vary as per application requirements. Each continuous membrane array 304, 306 is similar to the continuous membrane array 135 described in relation to FIG. 3A. Further, in the illustrated embodiment, a first separator structure 308 is positioned between the first continuous membrane array 304 and the second continuous membrane array 306. The first separator structure 308 is similar to the separator structure 302 described in relation to FIG. 3B.

A shape of the first separator structure 308 corresponds to a shape of the first and second continuous membrane arrays 304, 306 so that the first separator structure 308 can be received between the first and second continuous membrane arrays 304, 306. Moreover, a second separator structure 310 similar to the separator structure 302 explained in relation to FIG. 3B is disposed adjacent to the first continuous membrane array 304. The shape of the second separator structure 310 is similar to the shape of the first continuous membrane array 304. Further, each separator structure 308, 310 includes a generally V-shaped structure.

It should be noted that incorporation of the multiple continuous membrane arrays 304, 306 and the multiple separator structures 308, 310 may increase an overall thickness of the contactor media 126. The increase in the thickness of the contactor media 126 may increase an exposure time of the second fluid flowing through the contactor module 120 and reduction in pressure drop across the contactor module 120 which may in turn improve effectiveness of the contactor module 120.

Figure 4:
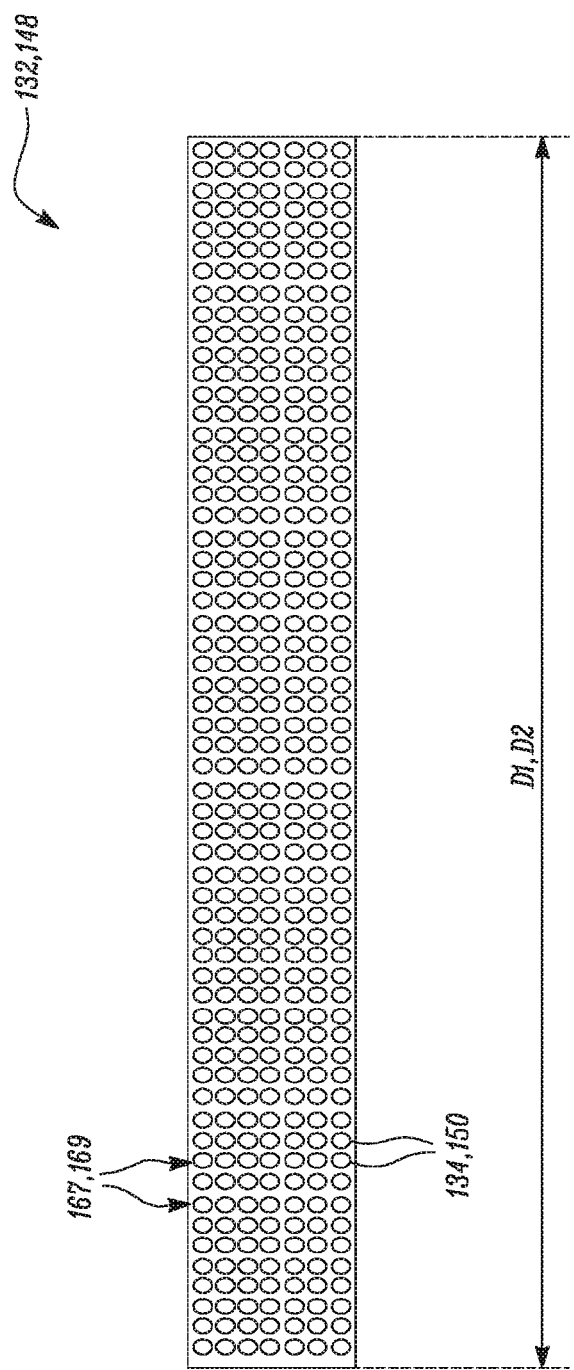
FIG. 4 illustrates a schematic view of membrane array associated with the contactor module of FIG. 3A in accordance with some embodiments discussed herein.

FIG. 4 illustrates a magnified view of the membrane arrays 132, 148 described in relation to FIG. 3A. The first membrane array 132 and the second membrane array 148 include similar design and are made of similar materials. For this purpose, a construction of the first and second membrane arrays 132, 148 will now be explained together in relation to FIG. 4. It should be noted that an arrangement of the membrane arrays 132, 148 illustrated herein is exemplary in nature. Each of the at least one first membrane array 132 and the at least one second membrane array 148 includes at least one membrane layer 167, 169. The at least one membrane layer 167, 169 includes the plurality of hollow fibers 134, 150. In the illustrated embodiment, each of the at least one first membrane array 132 and the at least one second membrane array 148 includes a plurality of membrane layers 167, 169 disposed adjacent to each other. More particularly, each first membrane array 132 and each second membrane array 148 includes a plurality of membrane layers 167, 169 disposed adjacent to each other. The membrane layers 167, 169 may be folded, pleated, or wound along a depth "D1", "D2" to form the continuous membrane array 135 (see FIG. 3A). The depth "D1" is substantially equal to the depth "D2". In the illustrated embodiment, each membrane array 132, 148 includes sixty membrane layers, without any limitations. In another embodiment, each membrane array 132, 148 may include twenty membrane layers or forty membrane layers, as per application requirements. Further, each membrane layer 167, 169 includes eight hollow fibers 134, 150. It may be contemplated that a total number of the membrane layers 167, 169 and a total number of the hollow fibers 134, 150 may vary, as per application requirements. The number of membrane layers 167, 169 and the hollow fibers 134, 150 may depend upon a desired efficiency of the contactor panel 106. It should be noted that, in some examples, the efficiency of the contactor panel 106 may be increased by increasing the membrane layers 167, 169 and the hollow fibers 134, 150.

Figure 5A:
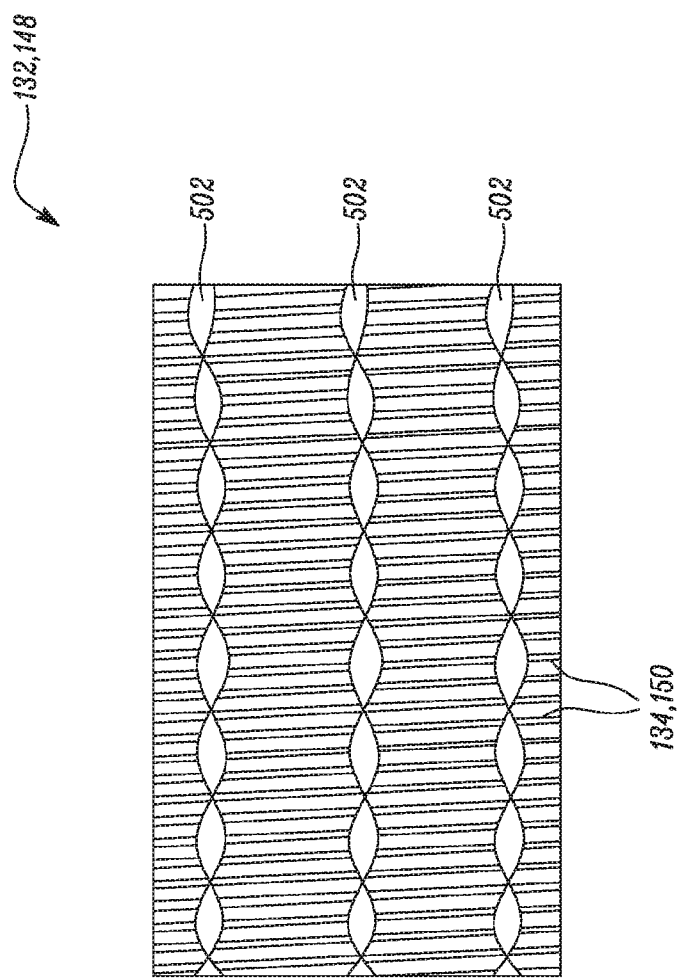
FIG. 5A illustrates a first technique of knitting a plurality of hollow fibers associated with the contactor module of FIG. 3A in accordance with some embodiments discussed herein.
Figure 5B:
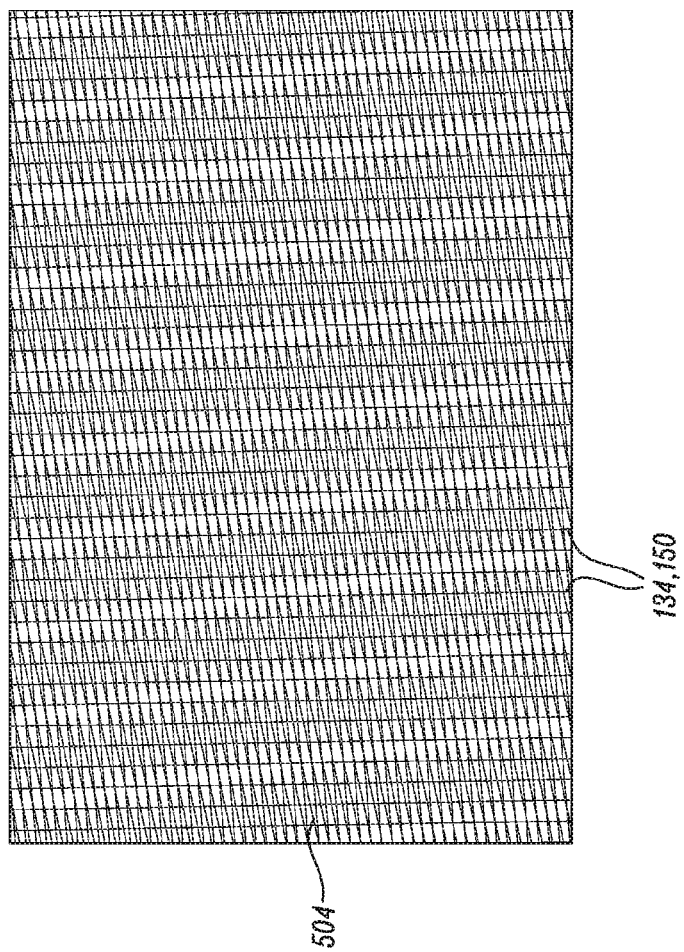
FIG. 5B illustrates a second technique of knitting the plurality of hollow fibers associated with the contactor module of FIG. 3A in accordance with some embodiments discussed herein.

Further, the plurality of hollow fibers 134, 150 are knitted to form the contactor media 126 explained in relation to FIG. 3A. More particularly, the hollow fibers 134 of the first membrane arrays 132, 150 and the hollow fibers 134 of the second membrane arrays 148 are knitted to form the continuous membrane array 135 (see FIG. 3A). The first membrane arrays 132 and the second membrane arrays 148 are knitted into an efficient array that may provide a high contact surface area to volume ratio. In one example, as illustrated in FIG. 5A, the hollow fibers 134, 150 may be knitted using a number of straight threads 502 to form the contactor media 126 (see FIG. 3A). More particularly, a straight knit mat technology may be used to knit the hollow fibers 134, 150. In another example, as illustrated in FIG. 5B, the hollow fibers 134, 150 are knitted by cross threads 504 to form the contactor media 126 (see FIG. 3A). More particularly, a cross wound mat technology may be used to knit the hollow fibers 134, 150. Further, in some examples, the membrane arrays 132, 148 may be skewed together. The threads 502, 504 may be made of a material that is similar to a material of the hollow fibers 134, 150. In one example, the threads 502, 504 may be made of PP. A material of the threads 502, 504 may be decided such that the threads 502, 504 are compatible with the second fluid.

Figure 6:
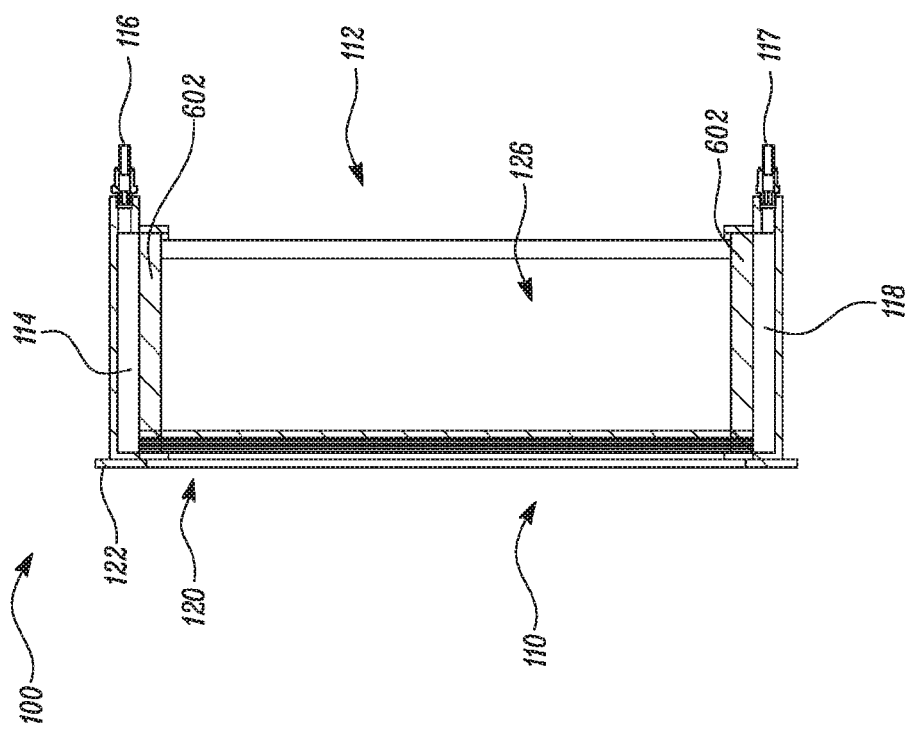
FIG. 6 illustrates a cross-sectional view of the contactor panel of FIG. 2 in accordance with some embodiments discussed herein.

FIG. 6 illustrates a cross-sectional side view of the contactor module 120 of FIG. 3A. As illustrated herein, in order to couple the contactor module 120 with the first and second headers 114, 118, the first and second ends 144, 146 (see FIG. 7A) of each first hollow fiber 134 (see FIG. 7A) are potted sealed around an outer diameter of the first hollow fiber 134 using a potting material 602. Further, the first and second ends 160, 162 (see FIG. 7B) of each second hollow fiber 150 are potted sealed around an outer diameter of the second hollow fiber 150 (see FIG. 7B) using the potting material 602. The ends 144, 146, 160, 162 may be embedded in a resin by potting methods, such as gravity potting method, mold potting method, centrifugal potting method, and the like. The potting material 602 may include epoxy, thermoplastics, polyurethane, etc. The potting material may seal each first hollow fiber 134 and each second hollow fiber 150 to the first header 114 and the second header 118. It should be noted that the ends 144, 146, 160, 162 are potted sealed such that each first lumen 138 and each second lumen 156 is in fluid communication with the first header 114 and the second header 118, respectively.

Figure 7A:
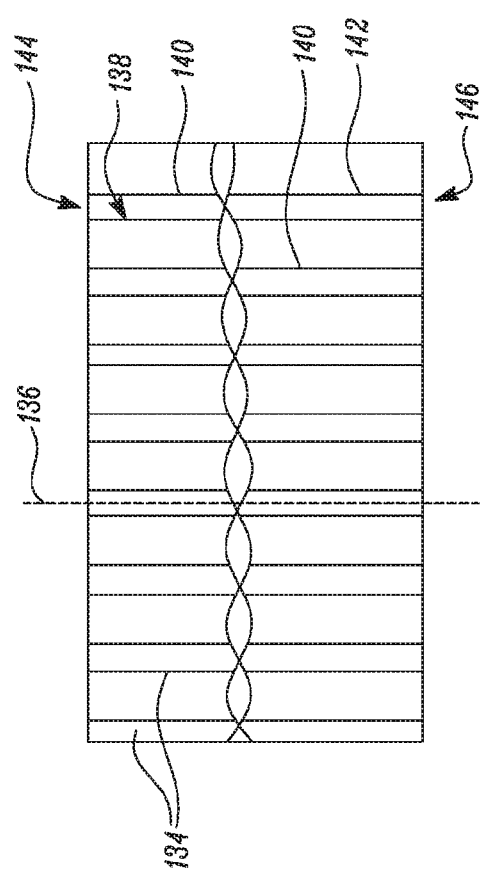
FIG. 7A illustrates a portion of a first membrane array associated with the contactor module of FIG. 3A in accordance with some embodiments discussed herein.

Referring now to FIGS. 7A and 7B, each first hollow fiber 134 (see FIG. 7A) defines the first lumen 138 (see FIG. 7A) and each second hollow fiber 150 (see FIG. 7B) defines the second lumen 156 (see FIG. 7B). The first fluid is adapted to flow through the first lumen 138 of each first hollow fiber 134 and the second lumen 156 of each second hollow fiber 150. More particularly, the first fluid received by the first header 114 (see FIGS. 2 and 6) from the tank 102 (see FIG. 1) is directed towards the first lumen 138 of each first hollow fiber 134 and the second lumen 156 of each second hollow fiber 150. The first fluid flows through the first and second lumens 138, 156 and is introduced in the second header 118 (see FIGS. 2 and 6). The second header 118 in turn directs the first fluid towards the tank 102.

Further, each first hollow fiber 134 defines the first exterior surface 140 (see FIG. 7A) and each second hollow fiber 150 defines the second exterior surface 158 (see FIG. 7B). The second fluid is adapted to contact the first exterior surface 140 of each first hollow fiber 134 and the second exterior surface 158 of each second hollow fiber 150. Further, the blower assembly 108 (see FIG. 1) is adapted to direct the second fluid towards the first exterior surface 140 of each first hollow fiber 134 and the second exterior surface 158 of each second hollow fiber 150.

Further, the contactor media 126 arranged in the V-shaped arrangement described herein may provide improved efficiency based on the increase in the contact surface area as compared to conventional contactor medias that typically include flat membrane arrays or wetted cellulosic media. In some examples, the contactor media 126 may provide a contact surface area that is approximately 4 times to 8 times the contact surface area provided by conventional contactor medias. Due to the higher contact surface area to volume ratio, a compact contactor media 126 may be used for different applications.

Further, when the contactor panel 106 (see FIG. 1) is associated with the evaporative cooling system, the first fluid, such as water, flows through the first and second lumens 138, 156 and the second fluid, such as hot and dry air, flows over the first and second exterior surfaces 140, 158. A material of the hollow fibers 134, 150 may restrict a passage of the first fluid through the walls 142, 143. Thus, only water vapor may pass from the first and second lumens 138, 156 towards the first and second exterior surfaces 140, 158 through evaporation. Further, as only water vapor passes across the membrane arrays 132, 148, a requirement of a mist capturing screen may be eliminated.

It should be noted that the size of the pores of the hollow fibers 134, 150 may be decided such that the pores may block bacteria and/or other dissolved minerals from entering the second fluid. Thus, the contactor module 120 may be used for filtering liquids, de-bubbling liquids, and the like. The walls 142, 143 of each first hollow fiber 134 and each second hollow fiber 150, respectively, may act as an inert medium that may bring the first fluid and the second fluid into direct contact, without dispersion. Further, the second fluid that is released may be cool and humid air. Moreover, both heat transfer and mass transfer occur when the contactor panel 106 is used in the evaporative cooling system. It should be noted that the mass transfer between the liquid and gas phases is governed by a pressure of the gas phase.

Further, when the contactor panel 106 is associated with the dehumidification system, the first fluid may be the liquid desiccant and the second fluid may be hot and humid air. The second fluid contacts with the first fluid flowing through the first lumen 138 of each first hollow fiber 134 and the second lumen 156 of each second hollow fiber 150. Based on the flow of the second fluid over the contactor media 126, a humidity of the second fluid decreases based on mass transfer between the first fluid and the second fluid. The second fluid that is released may be hot and dry air. Further, only mass transfer occurs when the contactor panel 106 is used in the dehumidification system.

Figure 8A:
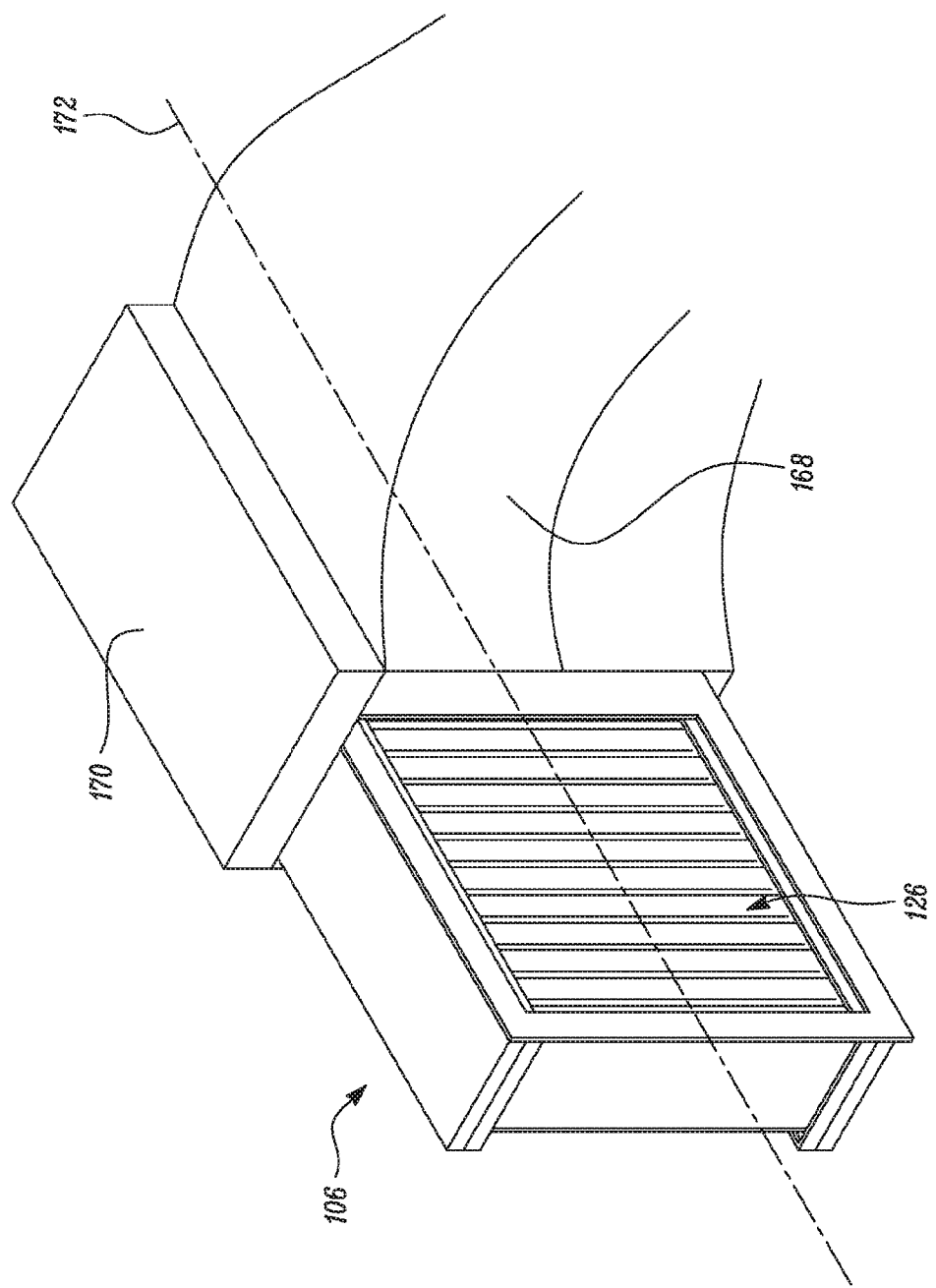
FIGS. 8A and 8B illustrate a duct for receiving the contactor panel of FIG. 2 in accordance with some embodiments discussed herein.
Figure 8B:
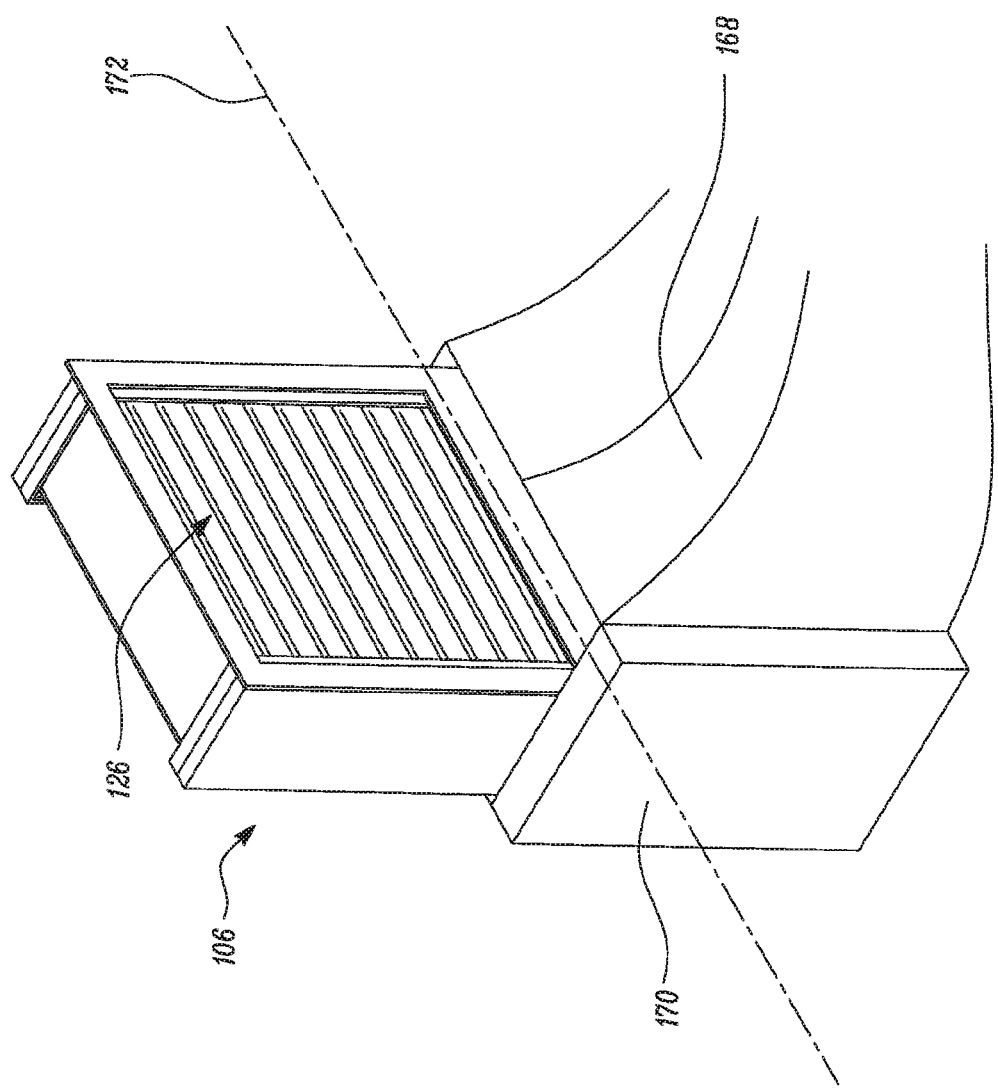

Further, as illustrated in FIGS. 8A and 8B, a duct 168 is adapted to receive the contactor panel 106. The duct 168 may be associated with the contactor system 100 (see FIG. 1). The duct 168 defines a longitudinal axis 172. The contactor panel 106 is positioned within a housing member 170 of the duct 168. The housing member 170 may receive a single contactor panel 106 or a pair of contactor panels 106. It should be noted that an orientation of the contactor panel 106 relative to the duct 168 may be varied based on application requirements. More particularly, as the contactor system 100 is embodied as a closed loop system, the contactor panel 120 may be installed in various orientations as evident from FIGS. 8A to 8D. In one example, as illustrated in FIG. 8A, the contactor panel 106 is positioned within the housing member 170 such that the first fiber axis 136 (see FIG. 7A) of each first hollow fiber 134 (see FIG. 7A) and the second fiber axis 152 (See FIG. 7B) of each second hollow fiber 150 (see FIG. 7B) is substantially perpendicular to the longitudinal axis 172 defined by the duct 168. In another example, as illustrated in FIG. 8B, the contactor panel 106 is positioned within the housing member 170 such that, the first fiber axis 136 (see FIG. 7A) of each first hollow fiber 134 (see FIG. 7A) and the second fiber axis 152 (see FIG. 7B) of each second hollow fiber 150 (see FIG. 7B) is substantially parallel to the longitudinal axis 172 defined by the duct 168.

Figure 8C:
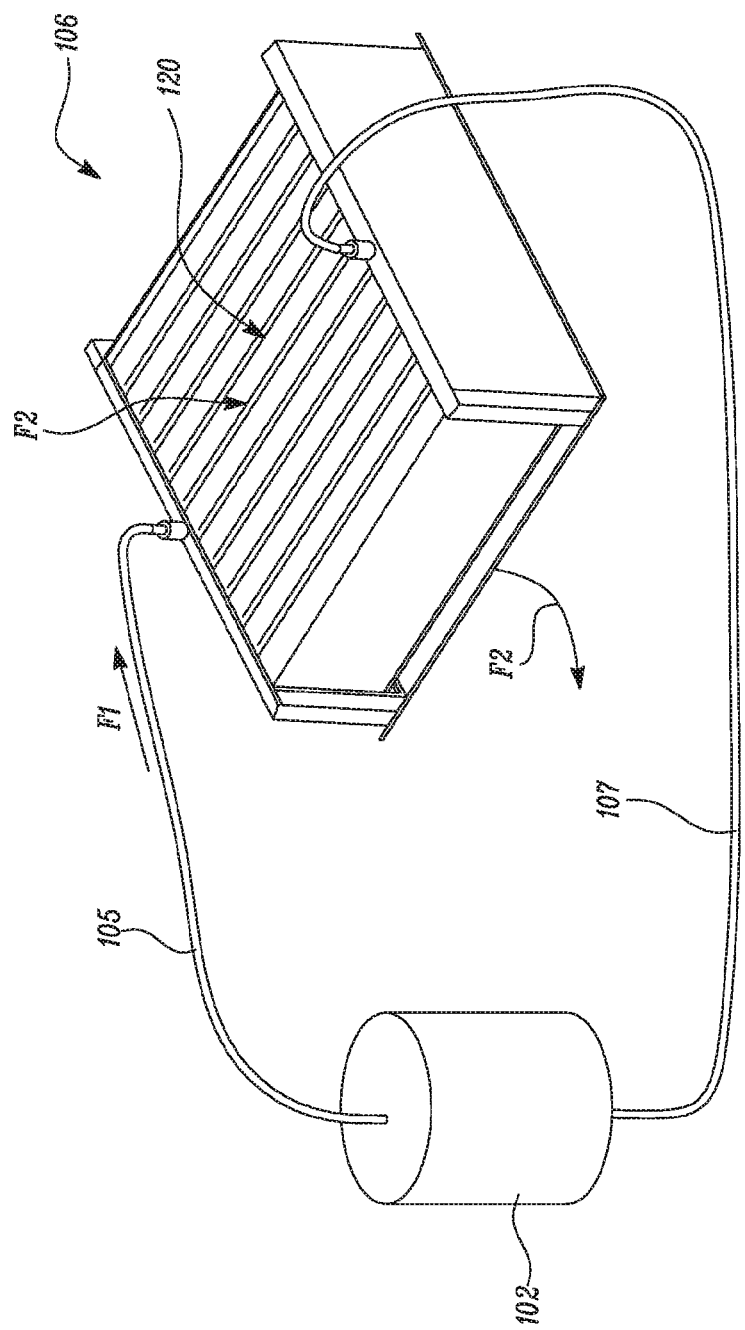
FIGS. 8C and 8D illustrate the contactor panel of FIG. 2 installed in different orientations in accordance with some embodiments of the present disclosure herein.

Referring now to FIG. 8C, the contactor panel 106 may also be disposed horizontally. In such examples, the first fluid from the tank 102 may be pressurized and directed towards the contactor panel 120 via the first fluid conduit 105. The first fluid returns to the tank 102 via the second fluid conduit 107. A flow of the first fluid through the contactor panel 106 is illustrated by the first fluid flow "F1". Further, the second fluid may flow over the contactor panel 106. A flow of the second fluid is illustrated by the second fluid flow "F2". Thus, the contactor panel 106 described herein may be used in applications that have limitations in terms of vertical space availability or applications that demand installation of the contactor panel 106 in a specific orientation based on a shape, a size, and an orientation of the duct 168 (see FIGS. 8A and 8B) that receives the contactor panel 106.

Figure 8D:
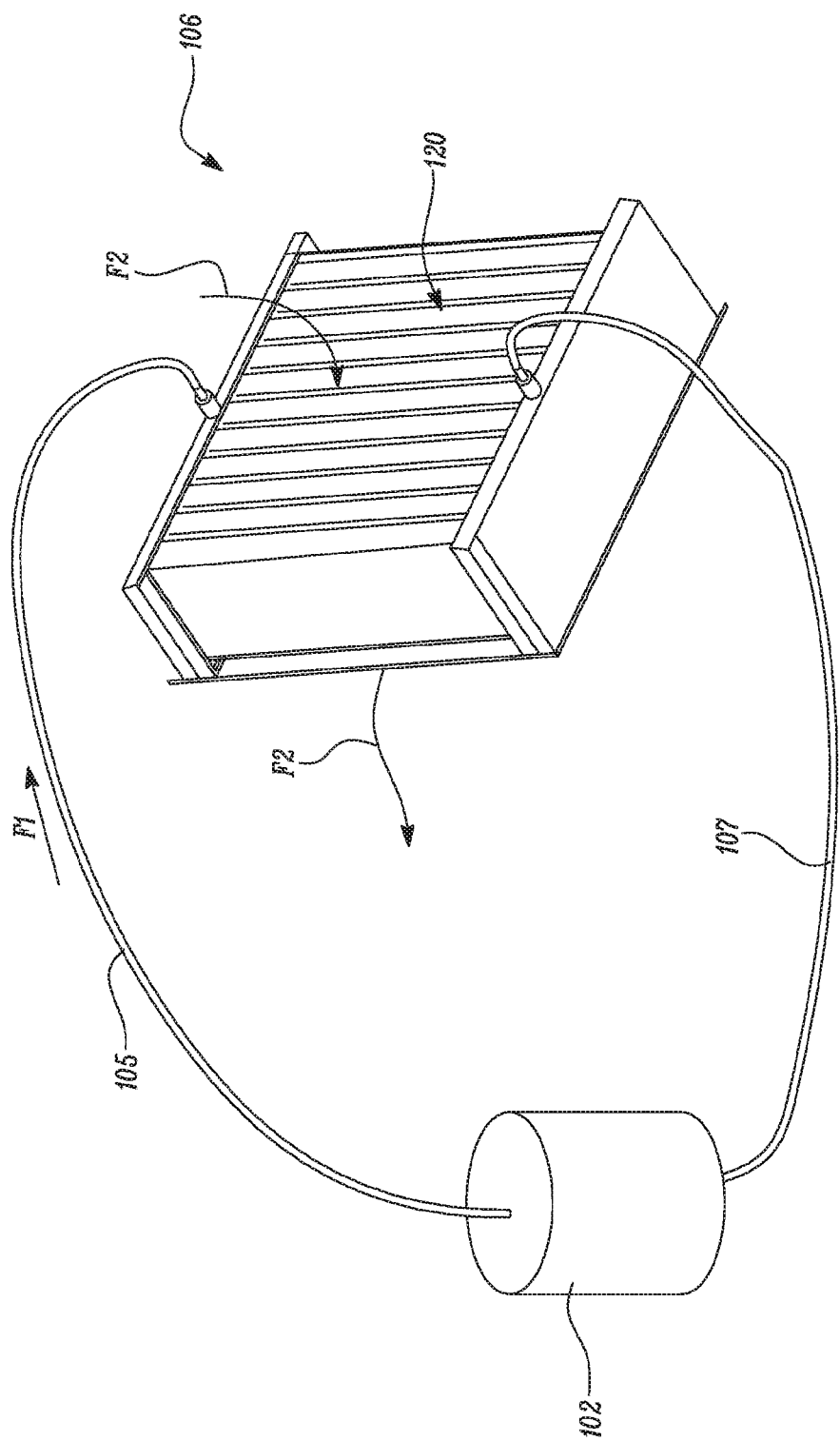

As shown in FIG. 8D, the contactor panel 106 may be disposed in an angular orientation. In such examples, the first fluid from the tank 102 may be pressurized and directed towards the contactor panel 106 via the first fluid conduit 105. The first fluid returns to the tank 102 via the second fluid conduit 107. A flow of the first fluid through the contactor panel is illustrated by the first fluid flow "F1". Further, the second fluid may flow over the contactor panel 106. A flow of the second fluid is illustrated by the second fluid flow "F2". Thus, the contactor panel 106 described herein may be used in applications that demand installation of the contactor panel 106 in a specific orientation based on a shape, a size, and an orientation of the duct 168 (see FIGS. 8A and 8B) that receives the contactor panel 106.

Figure 9:
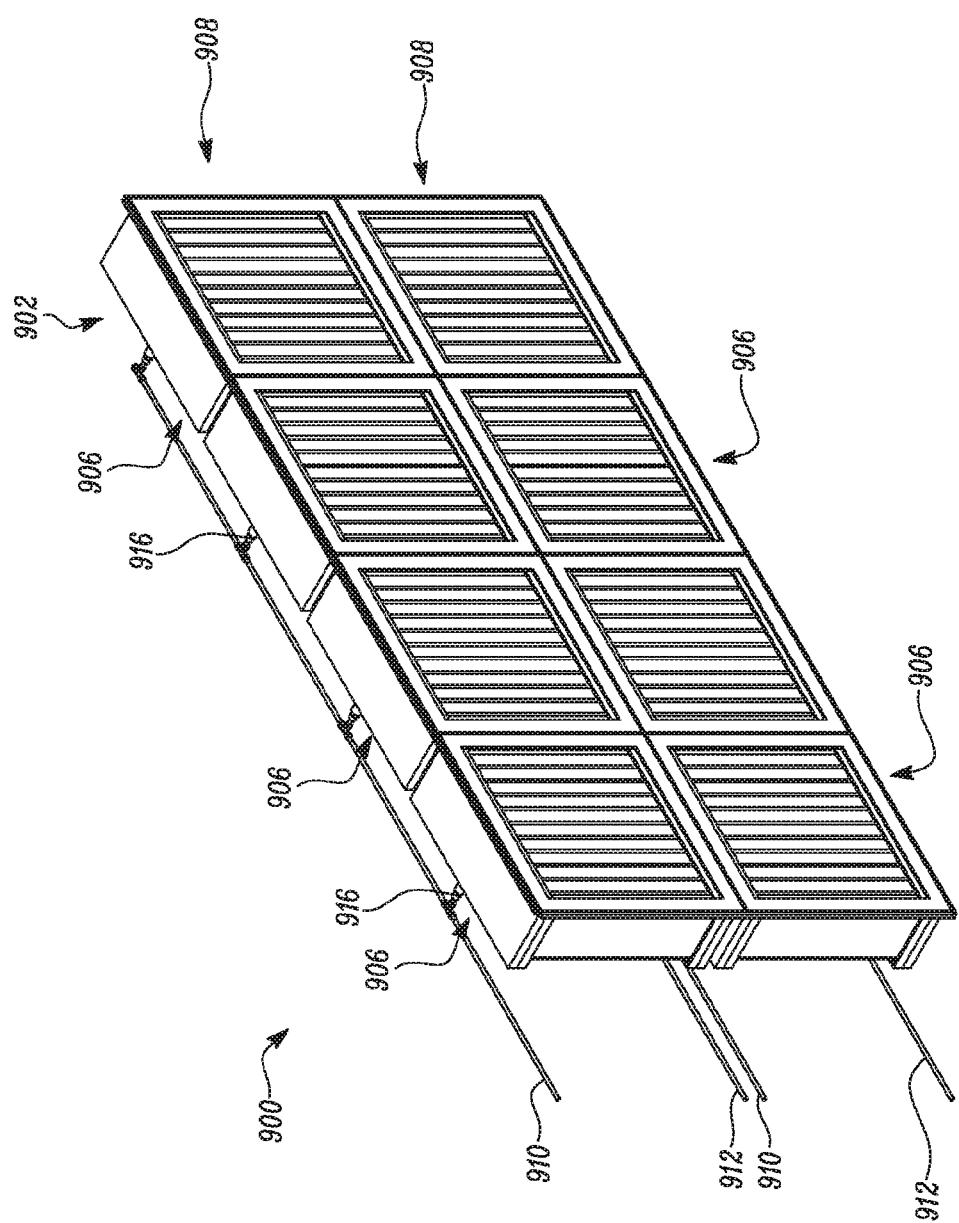
FIG. 9 illustrates an assembly of contactor panels associated with the contactor system of FIG. 1 in accordance with some embodiments discussed herein.

FIG. 9 illustrates another embodiment of the present disclosure. In this embodiment, the contactor system 900 includes an assembly 902 of a number of contactor panels 906. The contactor panels 906 are similar in design and construction to the contactor panel 106 (see FIG. 2) associated with the contactor system 100 explained in reference to FIGS. 1 to 8B. The assembly 902 may replace a single large contactor panel with the multiple contactor panels 906. The assembly 902 includes two arrays 908 of the contactor panels 906. Each array 908 includes four contactor panels 906 each. However, a number of the arrays 908 and the contactor panels 906 in each array 908 may vary based on application requirements. Further, each contactor panel 906 includes a first port 916 (see FIG. 2) similar to the first port 116 associated with the contactor system 100 and a second port (not shown) similar to the second port 117 (see FIG. 6) associated with the contactor system 100. Moreover, each array 908 includes a first fluid conduit 910 similar to the first fluid conduit 105 (see FIG. 1) associated with the contactor system 100. The first fluid conduit 910 is fluidly coupled with the first ports 916. Further, each array 908 includes a second fluid conduit 912 similar to the second fluid conduit 107 (see FIG. 1) associated with the contactor system 100. The second fluid conduit 912 is fluidly coupled with the second ports. The first and second fluid conduits 910, 912 may be in fluid communication with a tank (not shown) that is similar to tank 102 (see FIG. 1) associated with the contactor system 100. The assembly 902 of the multiple contactor panels 906 instead of a single large contactor panel may demonstrate improved efficiency, allow easier replacement and servicing, convenient storage/handling of the contactor panels 906, lower replacement costs, and/or the like.

Figure 10:
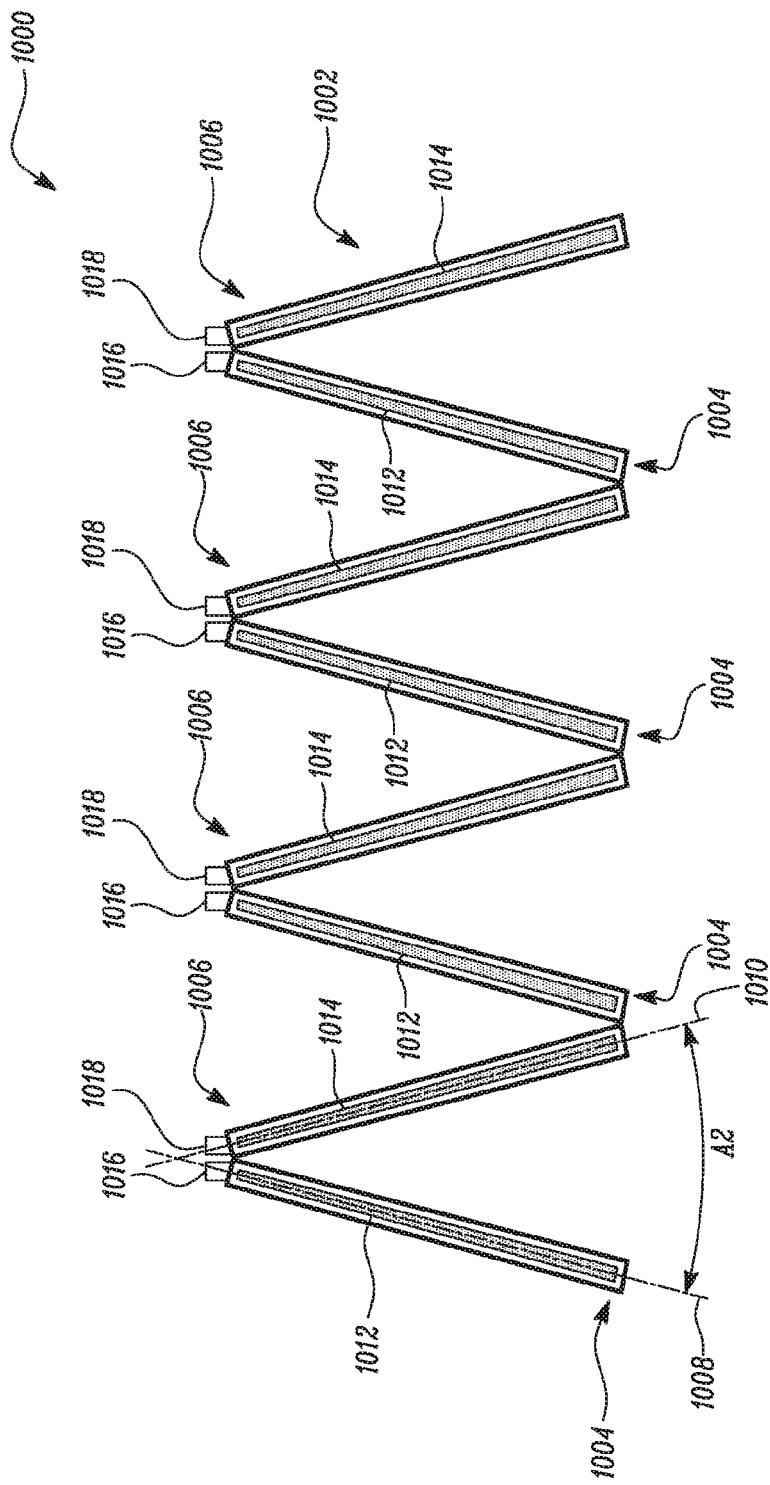
FIG. 10 illustrates an exemplary contactor panel arrangement associated with a contactor system in accordance with some embodiments discussed herein.

FIG. 10 illustrates another embodiment of a contactor system 1000 that is similar to the contactor system 100. In this embodiment, the contactor system 1000 includes a contactor panel arrangement 1002. More particularly, the contactor system 1000 includes at least one first contactor panel 1004 defining a first panel axis 1008 and at least one second contactor panel 1006 defining a second panel axis 1010. The first panel axis 1008 and the second panel axis 1010 may be embodied as a longitudinal axis defined by a frame member (not shown) of the corresponding contactor panel 1004, 1006. The at least one first contactor panel 1004 includes a first membrane array 1012 and the at least one second contactor panel 1006 includes a second membrane array 1014. Further, each of the first and second membrane arrays 1012, 1014 is similar to the hollow fiber membrane array described in the '302 patent. The at least one first contactor panel 1004 and the at least one second contactor panel 1006 is disposed such that a second inclination angle "A2" is defined between the first panel axis 1008 and the second panel axis 1010. The second inclination angle "A2" is greater than zero degree and less than 180 degrees. In some embodiments, the second inclination angle "A2" lies between 2 degrees and 175 degrees.

In the illustrated example, the contactor system 1000 includes a number of first contactor panels 1004 such that each first contactor panel 1004 defines the first panel axis 1008. The number of first contactor panels 1004 are substantially parallel to each other. Further, the contactor system 1000 includes a number of second contactor panels 1006 such that each second contactor panel 1006 defines the second panel axis 1010. The number of second contactor panels 1006 are substantially parallel to each other. Further, each first contactor panel 1004 is disposed adjacent to a corresponding second contactor panel 1006 such that the second inclination angle "A2" is defined therebetween. More particularly, the contactor panel arrangement 1002 includes the contactor panels 1004, 1006 arranged in a V-shaped manner such that each first contactor panel 1004 is angularly disposed relative to an adjacent second contactor panel 1006.

Each of the first and second contactor panels 1004, 1006 further include first ports 1016, 1018, respectively, and second ports (not shown) that allow introduction and exit of the first fluid. The first ports 1016, 1018 and the second ports may be in fluid communication with a tank (not shown) that is similar to the tank 102 of FIG. 1 via fluid conduits (not shown). The arrangement of the first and second contactor panels 1004, 1006 described herein may improve an effectiveness of the contactor system 1000 by increasing a surface contact area between the second fluid and the first and second membrane arrays 1012, 1014.

Figure 11:
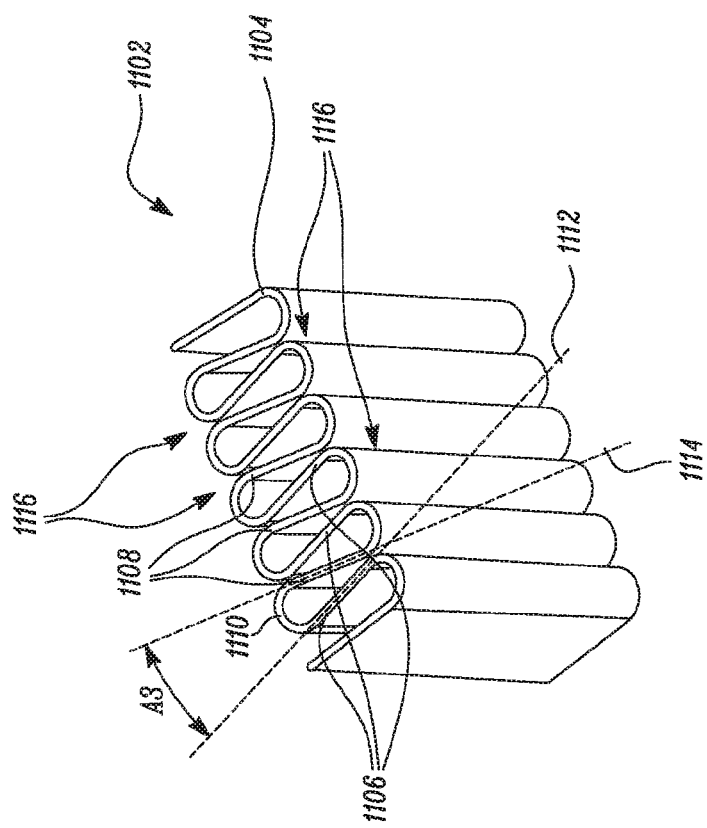
FIGS. 11, 12, and 13 illustrated various designs of a contactor media associated with the contactor system of FIG. 1 in accordance with some embodiments discussed herein.
Figure 12:
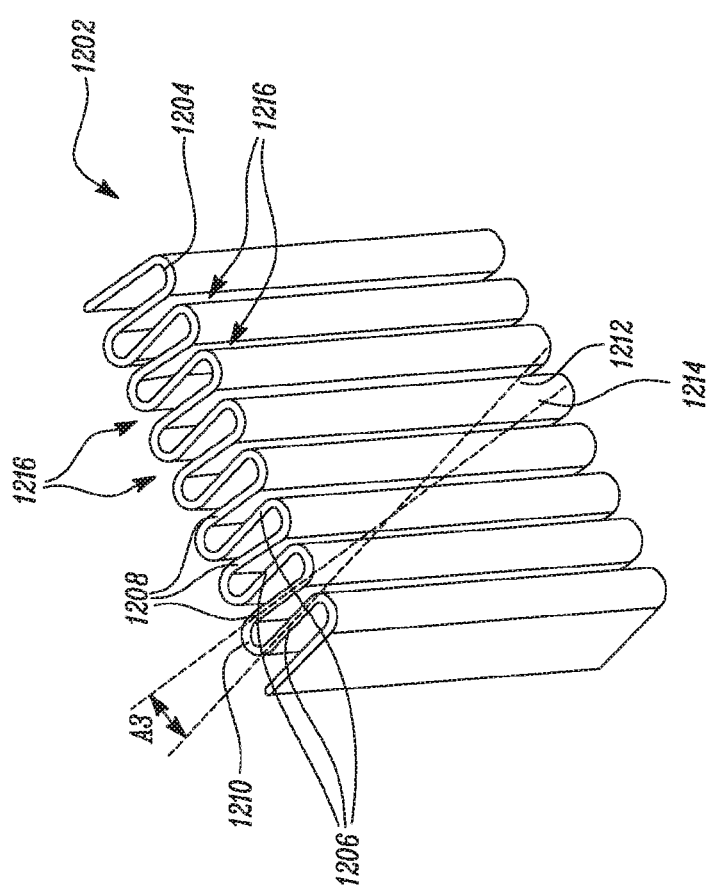
Figure 13:
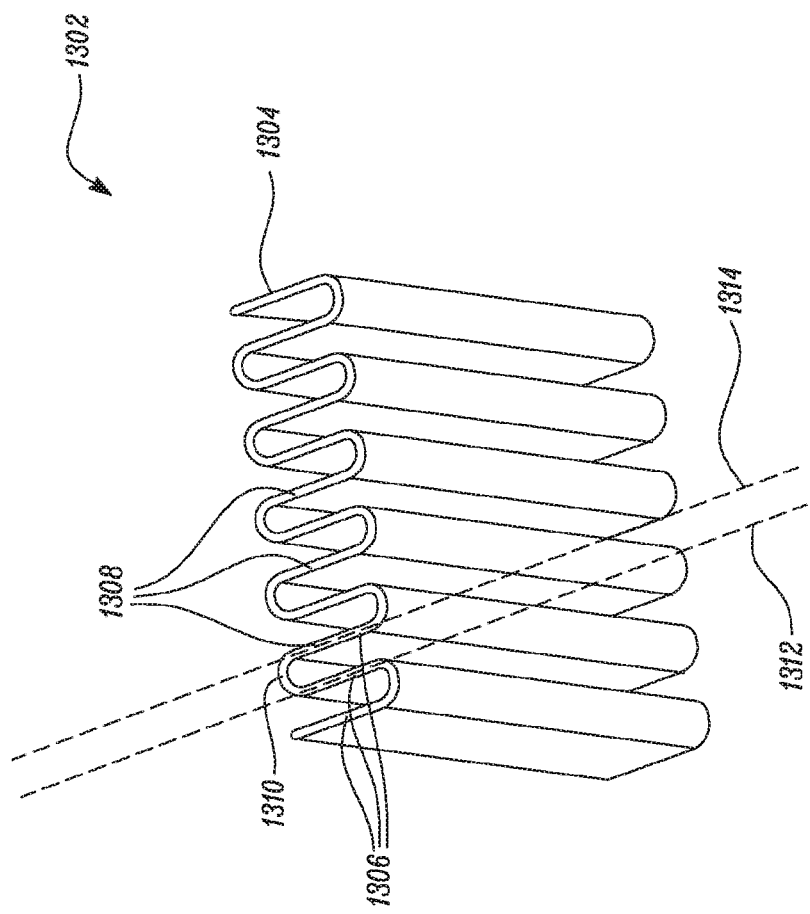

FIGS. 11, 12, and 13 illustrate various embodiments of the present disclosure. As illustrated in FIG. 11, a contactor media 1102 is illustrated. The contactor media 1102 may be associated with the contactor module 106 of FIGS. 1 and 2. The contactor media 1102 includes a continuous membrane array 1104 similar to the continuous membrane array 135 described in relation to FIG. 3A. The continuous membrane array 1104 includes a number of first membrane arrays 1106 and a number of second membrane arrays 1108. Materials of the first and second membrane arrays 1106, 1108 are similar to materials of the first and second membrane arrays 132, 148 described in relation to FIGS. 3A to 7B. As illustrated, each first membrane array 1106 is connected to an adjacently disposed second membrane array 1108 at a junction 1110.

Further, the first membrane arrays 1106 define a first axis 1112 and the second membrane arrays 1108 define a second axis 1114. In the illustrated example, a third inclination angle "A3" is defined between the first axis 1112 and the second axis 1114. The third inclination angle "A3" is greater than zero degree and less than 180 degrees. In some embodiments, the third inclination angle "A3" lies between 2 degrees and 175 degrees. As illustrated, each first membrane array 1106 and the adjacently disposed second membrane array 1108 converge at an end that is opposite to the junction 1110 such that a space 1116 is defined therebetween. However, as illustrated, the space 1116 defined between the first membrane arrays 1106 and the second membrane array 1108 is minimal such that each set of first membrane array 1106 and the second membrane array 1108 is substantially drop-shaped.

Referring to FIG. 12, a contactor media 1202 is illustrated. The contactor media 1202 may be associated with the contactor module 106 of FIGS. 1 and 2. The contactor media 1202 includes a continuous membrane array 1204 similar to the continuous membrane array 135 described in relation to FIG. 3A. The continuous membrane array 1204 includes a number of first membrane arrays 1206 and a number of second membrane arrays 1208. Materials of the first and second membrane arrays 1206, 1208 are similar to materials of the first and second membrane arrays 132, 148 described in relation to FIGS. 3A to 7B. As illustrated, each first membrane array 1206 is connected to an adjacently disposed second membrane array 1208 at a junction 1210.

Further, the first membrane arrays 1206 define a first axis 1212 and the second membrane arrays 1208 define a second axis 1214. In the illustrated example, a third inclination angle "A3" is defined between the first axis 1212 and the second axis 1214. The third inclination angle "A3" is greater than zero degree and less than 180 degrees. In some embodiments, the third inclination angle "A3" lies between 2 degrees and 175 degrees. As illustrated, each first membrane array 1206 and the adjacently disposed second membrane array 1208 converge at an end that is opposite to the junction 1210 such that a space 1216 is defined therebetween. It should be noted that the space 1216 is greater than the space 1116 (see FIG. 11) defined between the first and second membrane arrays 1106, 1108 (see FIG. 11). Moreover, it should be noted that the continuous membrane array 1204 is designed such that the third inclination angle "A3" defined between the first axis 1212 and the second axis 1214 is lesser than the third inclination angle "A3" defined between the first axis 1112 (see FIG. 11) and the second axis 1114 (see FIG. 11) of the first and second membrane arrays 1106, 1108.

FIG. 13 illustrates yet another design of the contactor media 1302. The contactor media 1302 may be associated with the contactor module 106 of FIGS. 1 and 2. In this embodiment, the contactor media 1302 includes a continuous membrane array 1304 similar to the continuous membrane array 135 described in relation to FIG. 3A. The continuous membrane array 1304 includes a number of first membrane arrays 1306 and a number of second membrane arrays 1308. Materials of the first and second membrane arrays 1306, 1308 are similar to materials of the first and second membrane arrays 132, 148 described in relation to FIGS. 3A to 7B. As illustrated, each first membrane array 1306 is connected to an adjacently disposed second membrane array 1308 at a junction 1310. In the illustrated example, the first membrane arrays 1306 are substantially parallel to the second membrane arrays 1308. As illustrated, the first membrane arrays 1306 define a first axis 1312 and the second membrane arrays 1308 define a second axis 1314 that is substantially parallel to the first axis 1312.

When used in evaporative cooling systems, the contactor panel 106, 906 and the contactor panel arrangement 1002 described herein may require a reduced quantity of water for operation thereof, due to high water vapor efficiency. Further, the contactor panel 106, 906 described herein may be retrofitted in existing contactor systems with minimum alterations to a design of the contactor systems. Moreover, the contactor panel 106, 906 and the contactor panel arrangement 1002 may be interchangeably used for different applications, such as humidifying or dehumidifying. It should be noted that the contactor panels 106, 906 associated with the contactor system 100, 900 and the contactor panel arrangement 1002 associated with the contactor system 1000 described herein may be used in large scale applications, such as in data centers. For example, the contactor panel 106, 906 and the contactor panel arrangement 1002 may be associated with the evaporative cooling system for cooling the data centers, other rooms installed with electronic devices, commercial applications, and the like. Further, the contactor panel 106, 906 and the contactor panel arrangement 1002 may be used in various applications for heating, cooling, humidifying, and/or dehumidifying, without limiting the scope of the present disclosure. Moreover, the contactor panel 106, 906 and the contactor panel arrangement 1002 may provide improved cooling performance in a compact footprint.

Various embodiments of the invention have been described. These and other embodiments are within the scope of the following claims.

What is claimed is:

1. A contactor module for a contactor panel, the contactor module comprising:
    a frame member;
    a contactor media coupled to the frame member, the contactor media defining a first side and a second side, wherein the contactor media includes:
        at least one first membrane array including a plurality of first hollow fibers extending along a first fiber axis, wherein the at least one first membrane array defines a first axis that is generally perpendicular to the first fiber axis and extending along the at least one first membrane array; and
        at least one second membrane array including a plurality of second hollow fibers extending along a second fiber axis, wherein the at least one second membrane array defines a second axis that is generally perpendicular to the second fiber axis and extending along the at least one second membrane array, wherein the at least one first membrane array and the at least one second membrane array is disposed such that a first inclination angle is defined between the first axis of the at least one first membrane array and the second axis of the at least one second membrane array, and wherein the first inclination angle is greater than zero degree and less than 180 degrees; and at least one separator structure disposed adjacent to the contactor media, wherein a shape of the at least one separator structure is similar to a shape of the contactor media in order to provide support for the contactor media, wherein the contactor media includes a plurality of first membrane arrays and a plurality of second membrane arrays, and the contactor media is a continuous membrane array defining the plurality of first membrane arrays and the plurality of second membrane arrays.

2. The contactor module of claim 1, wherein the contactor media includes alternately disposed first membrane arrays and second membrane arrays.

3. The contactor module of claim 1, wherein the plurality of first membrane arrays are substantially parallel to each other.

4. The contactor module of claim 1, wherein the plurality of second membrane arrays are substantially parallel to each other.

5. The contactor module of claim 1, wherein the contactor media includes at least two continuous membrane arrays disposed adjacent to each other.

6. The contactor module of claim 1, further comprising a plurality of first means for structural support disposed proximate the first side of the contactor media and a plurality of second means for structural support disposed proximate the second side of the contactor media.

7. The contactor module of claim 6, wherein the contactor media is at least one of wound, folded, and pleated about each of the first means for structural support and the second means for structural support.

8. The contactor module of claim 6, wherein each of the first means for structural support and the second means for structural support includes at least one of a bar member and a tension member.

9. The contactor module of claim 1, wherein the at least one first membrane array is connected to the at least one second membrane array proximate the first side of the contactor media and the at least one first membrane array is spaced apart from the at least one second membrane array proximate the second side of the contactor media.

10. The contactor module of claim 1, wherein the at least one first membrane array is connected to the at least one second membrane array proximate the second side of the contactor media and the at least one first membrane array is spaced apart from the at least one second membrane array proximate the first side of the contactor media.

11. The contactor module of claim 1, wherein each first hollow fiber defines a first lumen and each second hollow fiber defines a second lumen, and wherein a first fluid is adapted to flow through the first lumen of each first hollow fiber and the second lumen of each second hollow fiber.

12. The contactor module of claim 11, wherein the first fluid is at least one of a liquid and a gas.

13. A contactor panel including the contactor module of claim 11 wherein the contactor panel includes:

a first header in fluid communication with the first lumen of each first hollow fiber and the second lumen of each second hollow fiber, wherein the first header includes at least one first port that allows introduction of the first fluid in the first header; and a second header in fluid communication with the first lumen of each first hollow fiber and the second lumen of each second hollow fiber, wherein the second header includes at least one second port that allows exit of the first fluid from the second header.

14. The contactor panel of claim 13, further comprising:

at least one first contactor panel defining a first panel axis and at least one second contactor panel defining a second panel axis, wherein the at least one first contactor panel includes a first membrane array and the at least one second contactor panel includes a second membrane array, and wherein the at least one first contactor panel and the at least one second contactor panel is disposed such that a second inclination angle is defined between the first panel axis and the second panel axis, the second inclination angle being greater than zero degree and less than 180 degrees.

15. The contactor module of claim 1, wherein the at least one separator structure comprises a grille structure.

16. The contactor module of claim 1, wherein the at least one separator structure comprises a honeycomb structure.

17. The contactor module of claim 1, wherein the at least one separator structure comprises a sheet of metal or polymer having through apertures.

* * * * *